(12) United States Patent
Kato et al.

(10) Patent No.: US 8,473,136 B2
(45) Date of Patent: Jun. 25, 2013

(54) POWER SUPPLY SYSTEM FOR ELECTRICALLY POWERED VEHICLE AND METHOD FOR CONTROLLING THE SAME

(75) Inventors: Norihiko Kato, Handa (JP); Masaya Yamamoto, Kasugai (JP); Haruki Sato, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 37 days.

(21) Appl. No.: 13/377,415

(22) PCT Filed: Jun. 10, 2009

(86) PCT No.: PCT/JP2009/060593
§ 371 (c)(1),
(2), (4) Date: Dec. 9, 2011

(87) PCT Pub. No.: WO2010/143281
PCT Pub. Date: Dec. 16, 2010

(65) Prior Publication Data
US 2012/0109442 A1    May 3, 2012

(51) Int. Cl.
*B60L 9/00* (2006.01)
*B60L 11/00* (2006.01)
*G05D 1/00* (2006.01)
*G05D 3/00* (2006.01)
*G06F 17/00* (2006.01)

(52) U.S. Cl.
USPC ..... 701/22; 180/65.21; 180/65.25; 180/65.29

(58) Field of Classification Search
USPC ............. 701/22; 180/65.25, 65.21, 65.29
See application file for complete search history.

(56) References Cited

U.S. PATENT DOCUMENTS

| 7,506,182 | B2 * | 3/2009 | Taniguchi et al. | 713/300 |
| 7,891,451 | B2 * | 2/2011 | Oyobe et al. | 180/65.275 |
| 8,004,109 | B2 * | 8/2011 | Komatsu | 307/9.1 |
| 2007/0199747 | A1 * | 8/2007 | Aoyagi et al. | 180/65.3 |

(Continued)

FOREIGN PATENT DOCUMENTS

| JP | 2007-062638 A | 3/2007 |
| JP | 2008-109840 A | 5/2008 |
| JP | 2008-167620 A | 7/2008 |
| JP | 2008-220084 A | 9/2008 |

OTHER PUBLICATIONS

International Search Report mailed Sep. 15, 2009 of PCT/JP2009/060593.

*Primary Examiner* — Mary Cheung
*Assistant Examiner* — Frederick Brushaber
(74) *Attorney, Agent, or Firm* — Kenyon & Kenyon LLP

(57) ABSTRACT

A power supply system for a hybrid vehicle includes a main power storage device and a plurality of sub power storage devices used selectively. When SOC of each power storage device decreases to an SOC control target, the running mode transitions from a CD mode of running with stored electric energy with an engine stopped to a CS mode of running while maintaining stored electric energy by power generation of the engine. An ECU determines a usage pattern of the power storage devices in the CS mode and the CD mode at startup of the power supply system following the start of vehicle driving. Further, in accordance with the determined usage pattern, the ECU appropriately sets an individual SOC target for each power storage device such that, upon ensuring stored electric energy available at the start of the CS mode, stored electric energy to be used in the CD mode is maximized.

14 Claims, 9 Drawing Sheets

U.S. PATENT DOCUMENTS

| | | |
|---|---|---|
| 2009/0101421 A1 | 4/2009 | Oyobe et al. |
| 2009/0103341 A1* | 4/2009 | Lee et al. .................. 363/124 |
| 2010/0006360 A1* | 1/2010 | Kishimoto ............. 180/65.285 |
| 2010/0038962 A1 | 2/2010 | Komatsu |
| 2010/0096918 A1 | 4/2010 | Sawada et al. |
| 2010/0100265 A1* | 4/2010 | Kato .............................. 701/22 |
| 2010/0138087 A1* | 6/2010 | Takaoka ......................... 701/22 |
| 2010/0250043 A1* | 9/2010 | Scheucher ..................... 701/22 |
| 2011/0040436 A1* | 2/2011 | Yamamoto et al. ............ 701/22 |
| 2011/0082611 A1* | 4/2011 | Shiba .............................. 701/22 |
| 2011/0087395 A1* | 4/2011 | Yamamoto et al. ............ 701/22 |
| 2011/0251745 A1* | 10/2011 | Yamamoto et al. ............ 701/22 |
| 2011/0257825 A1* | 10/2011 | Yamamoto et al. ............ 701/22 |
| 2012/0013184 A1* | 1/2012 | Kato ............................ 307/9.1 |
| 2012/0065827 A1* | 3/2012 | Kimura et al. ................. 701/22 |
| 2012/0089290 A1* | 4/2012 | Kato et al. ...................... 701/22 |

* cited by examiner

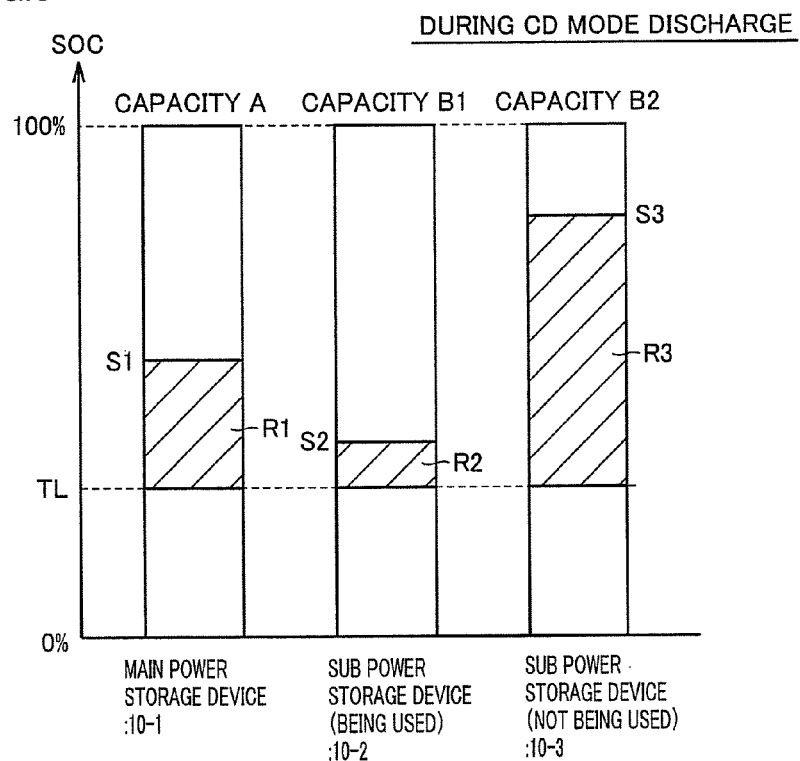
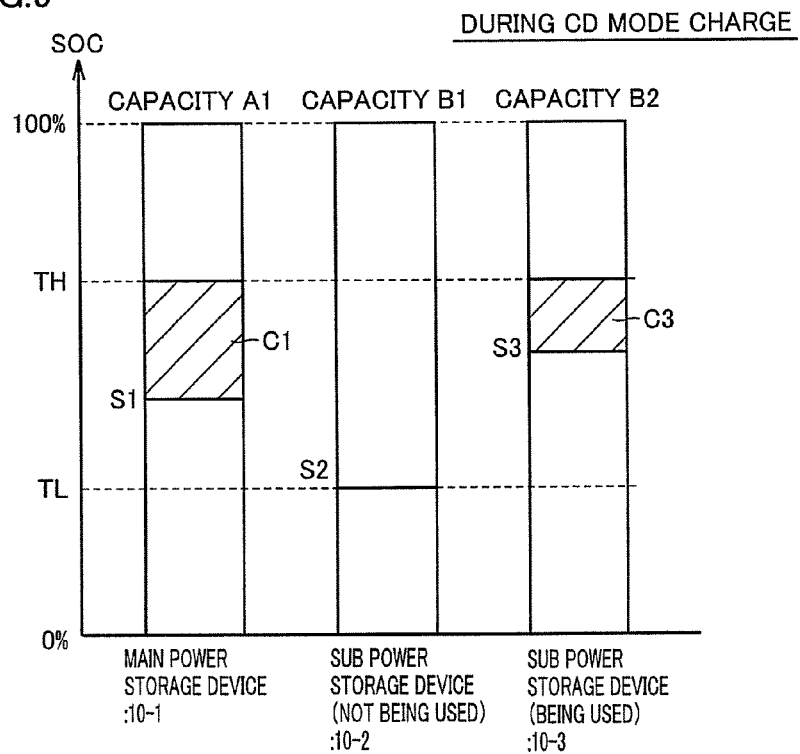

POWER SUPPLY SYSTEM FOR ELECTRICALLY POWERED VEHICLE AND METHOD FOR CONTROLLING THE SAME

This is a 371 national phase application of PCT/JP2009/060593 filed 10 Jun. 2009, the contents of which are incorporated herein by reference.

TECHNICAL FIELD

The present invention relates to a power supply system for an electric-powered vehicle and a method of controlling the same, and more particularly to charge and discharge control for a power supply system including a plurality of power storage devices.

BACKGROUND ART

Electrically powered vehicles capable of running with electric energy, such as hybrid vehicles, electric vehicles and fuel cell vehicles, have been developed and put into practical use as environmentally friendly vehicles. An electric-powered vehicle has mounted thereon a motor generating vehicle drive force and a power storage device storing electric power for driving the motor.

Further, some electric-powered vehicles have mounted thereon a mechanism generating charge electric power for the power storage device during running. For example, a hybrid vehicle has mounted thereon the above-described internal combustion engine in addition to the above-described motor and the above-described power storage device. Outputs from the internal combustion engine are used as vehicle drive force and/or generated motive power for charging the power storage device.

In a conventional hybrid vehicle, charge and discharge control of maintaining SOC (State Of Charge) indicating a remaining capacity of the power storage device at a level of 50 to 60% of full charge is generally performed such that regenerative electric power during regenerative braking can be accepted while ensuring electric power for generation of drive force by the motor.

On the other hand, in recent years, a structure in which an on-vehicle power storage device of a hybrid vehicle is charged by a power supply outside the vehicle (hereinafter also called an "external power supply") has been proposed. In an electric-powered vehicle chargeable by an external power supply, in order to improve energy efficiency, such charge and discharge control that the power storage device is charged to a full charge level by external charging before the start of driving, while stored electric energy is used up almost to a lower limit value of SOC at the end of driving is targeted.

For this reason, a hybrid vehicle has also been developed in which, in addition to a conventional running mode of maintaining SOC of the power storage device, i.e., stored electric energy, at a constant level, a running mode of mainly running only with a motor without maintaining SOC of the power storage device is newly introduced. It is noted that, the former running mode is referred to as an "HV (Hybrid Vehicle) mode" since the engine is operated for generating charge electric power for the power storage device, or a "CS (Charge Sustaining) mode" (in the present specification, hereinafter referred to as a "CS mode") since stored electric energy charged in the power storage device is maintained. The latter running mode is referred to as an "EV (Electric Vehicle) mode" since the vehicle mainly runs only with the motor, or a "CD (Charge Depleting) mode" (in the present specification, hereinafter referred to as a "CD mode") since stored electric energy decreases.

Regarding a power supply system mounted on such a hybrid vehicle, Japanese Patent Laying-Open No. 2008-109840 (PTL 1), for example, discloses a structure in which a plurality of power storage devices (batteries) are connected in parallel so as to increase the distance that can be traveled by stored electric energy in the on-vehicle power storage devices.

In the structure disclosed in PTL 1, an acceptable charge amount and an available discharge amount are calculated for each power storage device in accordance with a remaining capacity, and a charge allocation ratio and a discharge allocation ratio among the plurality of power storage devices are determined based on the calculated acceptable charge amount and available discharge amount. Since charge and discharge of each power storage device is controlled in accordance with the determined allocation ratios, performance of the system can be exhibited to its maximum, even when charge and discharge characteristics of the plurality of power storage devices are different among them.

Moreover, Japanese Patent Laying-Open No. 2008-167620 (PTL 2) discloses a structure of a power supply device in a vehicle having mounted thereon a main power storage device and a plurality of sub power storage devices, wherein a converter corresponding to the main power storage device and a converter shared by the plurality of sub power storage devices are provided. According to this structure, energy that can be stored can be increased while reducing the number of converters.

In the structure disclosed in PTL 2, one of the plurality of sub power storage devices is selectively connected to the converter, and drive electric power for a vehicle drive motor is supplied from the main power storage device and the selected sub power storage device. In such a power supply device, the plurality of sub power storage devices are used sequentially such that a new sub power storage device is connected to the converter when SOC of a sub power storage device that is being used decreases, thereby increasing the running distance with stored electric energy (EV running distance).

CITATION LIST

Patent Literature

PTL 1: Japanese Patent Laying-Open No. 2008-109840
PTL 2: Japanese Patent Laying-Open No. 2008-167620

SUMMARY OF INVENTION

Technical Problem

In an electric-powered vehicle (typically, a hybrid vehicle) having the above-described CD mode and CS mode, fuel efficiency can be improved by increasing the running distance in the CD mode. On the other hand, in the CS mode in which the engine is operated, it is necessary to cover some degree of request power requested of the vehicle as a whole by electric power of the power storage devices in order to restrict the engine operating point to a highly efficient region. In other words, if there is not enough stored electric energy (SOC), flexibility in vehicle control (flexibility in engine operating point in the hybrid vehicle) deteriorates, so that fuel efficiency may deteriorate.

Usually, if SOC of a power storage device decreases to a prescribed control target, the running mode is selected to transition from the CD mode to the CS mode. Therefore, from the above-described reason, setting an SOC control target appropriately contributes to an improvement in fuel efficiency.

Moreover, in the power supply system disclosed in PTL 2, by actively disconnecting all the sub power storage devices electrically from the converter after all of the sub power storage devices have been used, it can be expected that flexibility in controlling the power supply system in the CS mode is improved, so that energy efficiency is enhanced. On the other hand, if a sub power storage device used at last remains connected to the power supply system also in the CS mode, the main power storage device and one sub power storage device can be used, which can ensure electric power that can be input/output to/from the overall power supply system.

Therefore, to simultaneously achieve an increase in running distance (EV running distance) in the CD mode and an improvement in fuel efficiency, it is necessary to effectively utilize energy of the power storage devices in consideration of the usage pattern of the sub power storage devices as described above and an electric power amount available when transition to the CS mode is made.

The present invention was made to solve these problems, and an object of the present invention is to improve the usage efficiency of power storage devices in an electric-powered vehicle having mounted thereon a power supply system including a main power storage device and a plurality of sub power storage devices, thereby simultaneously achieving an increase in running distance in the CD mode (EV running distance) and an improvement in fuel efficiency.

Solution to Problem

A power supply system for an electric-powered vehicle according to the present invention is a power supply system of an electric-powered vehicle having mounted thereon a motor as a motive power source and a power generation mechanism configured to be capable of generating electric power while the vehicle is running, including a rechargeable main power storage device, first and second voltage converters, a plurality of rechargeable sub power storage devices arranged in parallel to each other, a connection control unit, an external charging unit, a charged state calculation unit, a running mode control unit, and a control target setting unit. The first voltage converter is provided between a power feeding line electrically connected to the motor and to the power generation mechanism and the main power storage device, and is configured to perform bidirectional voltage conversion. The second voltage converter is provided between the plurality of sub power storage devices and the power feeding line, and is configured to perform bidirectional voltage conversion between one of the plurality of sub power storage devices and the power feeding line. The connection control unit is configured to control a plurality of switches provided between the plurality of sub power storage devices and the second voltage converter, respectively. The external charging unit is configured to charge the main power storage device and each of the sub power storage devices by a power supply outside the vehicle. The charged state calculation unit is configured to calculate a remaining capacity estimate value of each of the main power storage device and the plurality of sub power storage devices, based on a state detection value of each of the main power storage device and the plurality of sub power storage devices. The running mode control unit is configured to select one of a first running mode of running using stored electric energy of the electric-powered vehicle with priority without maintaining the stored electric energy and a second running mode of maintaining the stored electric energy within a certain range using the power generation mechanism, based on the remaining capacity estimate value of each of the main power storage device and the plurality of sub power storage devices. The control target setting unit individually sets a control target for a remaining capacity of each of the main power storage device and the plurality of sub power storage devices, in accordance with a usage pattern of the plurality of sub power storage devices determined at least at startup of the power supply system. The connection control unit controls on/off of the plurality of switches in accordance with the usage pattern in each of the first running mode and the second running mode. The running mode control unit selects the first running mode until all of the remaining capacity estimate values of the main power storage device and the plurality of sub power storage devices decrease to the control targets, respectively, and selects the second running mode after all of the remaining capacity estimate values decrease to the control targets, respectively.

A method of controlling a power supply system for an electric-powered vehicle according to the present invention is a method of controlling a power supply system of an electric-powered vehicle having mounted thereon a motor as a motive power source and a power generation mechanism configured to be capable of generating electric power while the vehicle is running. The power supply system includes the above-described main power storage device, the above-described first voltage converter, the above-described plurality of sub power storage devices, the above-described second voltage converter, the above-described connection control unit, and the above-described external charging unit. The method of controlling includes the steps of determining a usage pattern of the plurality of sub power storage devices in accordance with a state of each of the sub power storage devices at least at startup of the power supply system, individually setting a control target for a remaining capacity of each of the main power storage device and the plurality of sub power storage devices, in accordance with the usage pattern, calculating a remaining capacity estimate value of each of the main power storage device and the plurality of sub power storage devices, based on a state detection value of each of the main power storage device and the plurality of sub power storage devices, and selecting one of a first running mode, of running using stored electric energy of the electric-powered vehicle with priority without maintaining the stored electric energy and a second running mode of maintaining the stored electric energy within a certain range using the power generation mechanism, based on the remaining capacity estimate value of each of the main power storage device and the plurality of sub power storage devices. In the selecting step, the first running mode is selected until all of the remaining capacity estimate values of the main power storage device and the plurality of sub power storage devices decrease to the control targets, respectively, and the second running mode is selected after all of the remaining capacity estimate values decrease to the control targets, respectively.

According to the power supply system for an electric-powered vehicle and the method of controlling the same, an SOC control target at the time when transition from the first running mode (CD mode) to the second running mode (CS mode) is made can be set appropriately for each of the main power storage device and the sub power storage devices, in accordance with the usage pattern of the plurality of sub power storage devices (e.g., whether or not each sub power storage device is disconnected from the power supply system in the second running mode). As a result, the running distance in the CD mode can be increased by effectively utilizing stored electric energy of the sub power storage devices, while enough stored electric energy for improving fuel efficiency can be ensured by securing flexibility in vehicle control in the CS mode (e.g., vehicle control so as to restrict the operating point of the internal combustion engine to a highly efficient region in the hybrid vehicle). Therefore, by improving the usage efficiency of the main power storage device and the sub power storage devices, an increase in EV running distance (running distance in the CD mode) and an improvement in fuel efficiency can simultaneously be achieved.

Preferably, in a usage pattern of disconnecting each of the plurality of sub power storage devices from the second voltage converter in the second running mode, the control target setting unit or the setting step sets the control target of the main power storage device higher than the control target of each of the sub power storage devices.

Thus, using the usage pattern of disconnecting all of the sub power storage devices from the power supply system in the second running mode (CS mode), the voltage on the power feeding line can be reduced without forming a short-circuit path between the main power storage device and the sub power storage devices. Thereby, the switching loss in the first voltage converter is reduced, so that the power supply system can be improved in energy efficiency. Then, stored electric energy (SOC) of the sub power storage devices available in the first running mode (CD mode) can be increased, while SOC of the main power storage device in the CS mode can be ensured. As a result, in the above-described usage pattern, an increase in EV running distance (running distance in the CD mode) and an improvement in fuel efficiency can simultaneously be achieved.

More preferably, in a usage pattern of disconnecting each of the plurality of sub power storage devices from the second voltage converter in the second running mode, the control target setting unit or the setting step sets the control target of the main power storage device at a value higher than a value of the control target in a usage pattern of connecting one of the plurality of sub power storage devices to the second voltage converter in the second running mode.

Thus, stored electric energy (SOC) available at the start of the CS mode can be equivalently ensured in accordance with whether or not the sub power storage devices are disconnected from the power supply system in the second running mode (CS mode). As a result, an improvement in fuel efficiency in the CS mode can be achieved, and an increase in EV running distance (running distance in the CD mode) can be achieved.

Further preferably, when in a usage pattern of fixedly connecting one sub power storage device of the plurality of sub power storage devices to the second voltage converter throughout the first running mode and the second running mode, the control target setting unit or the setting step sets each of the control targets of the main power storage device and the one sub power storage device at a first value. This first value is an intermediate value between a second value indicating the control target of each of the sub power storage devices and a third value indicating the control target of the main power storage device when in a usage pattern of disconnecting each of the plurality of sub power storage devices from the second voltage converter in the second running mode.

Thus, in the situation where electric power is difficult to ensure, such as when the temperature is extremely low, input/output electric power to/from the power storage devices as a whole can be ensured by fixedly using the main power storage device and a specific sub power storage device throughout the first running mode (CD mode) and the second running mode (CS mode). In this usage pattern, the EV running distance (running distance in the CD mode) can be ensured giving consideration to appropriately ensuring stored electric energy (SOC) available at the start of the CS mode.

Alternatively preferably, when in a usage pattern of sequentially connecting one of the plurality of sub power storage devices to the second voltage converter in the first running mode and continuously connecting a last sub power storage device of the plurality of sub power storage devices to the second voltage converter in the second running mode, the control target setting unit or the setting step sets the control targets of the main power storage device and the last sub power storage device at a first value, and sets the control target of each of the sub power storage devices except the last sub power storage device at a second value lower than the first value.

Thus, stored electric energy of each sub power storage device is used in the first running mode (CD mode), while the main power storage device and one sub power storage device can be used in the second running mode (CS mode), so that electric power that can be input/output to/from the power supply system can be ensured. In this usage pattern, the EV running distance (running distance in the CD mode) can be increased, while stored electric energy (SOC) available at the start of the CS mode can be ensured appropriately.

Preferably, in a first usage pattern of connecting one of the plurality of sub power storage devices to the second voltage converter in the second running mode, the control target setting unit or the setting step sets each of the control targets of the main power storage device and the one sub power storage device at a first value, and in a second usage pattern of sequentially connecting one of the plurality of sub power storage devices to the second voltage converter in the first running mode and disconnecting each of the plurality of sub power storage devices from the second voltage converter in the second running mode, the control target setting unit or the setting step sets the control target of each of the sub power storage devices at a second value lower than the first value, and sets the control target of the main power storage device at a third value higher than the first value. The first to third values are determined such that, at a starting point of the second running pattern, a sum of remaining capacities of the main power storage device and the one sub power storage device in the first usage pattern and a remaining capacity of the main power storage device in the second usage pattern are equivalent to each other.

Thus, stored electric energy (SOC) available at the start of the CS mode can be equivalently ensured among different usage patterns of the plurality of power storage devices.

A power supply system for an electric-powered vehicle of another aspect of the present invention is a power supply system of an electric-powered vehicle having mounted thereon a motor as a motive power source and a power generation mechanism configured to be capable of generating electric power while the vehicle is running, including a rechargeable main power storage device, first and second voltage converters, a plurality of rechargeable sub power storage devices arranged in parallel to each other, a connection control unit, an external charging unit, a charged state calculation unit, a running mode control unit, and a control target setting unit. The first voltage converter is provided between a power feeding line electrically connected to the motor and to the power generation mechanism and the main power storage device, and is configured to perform bidirectional voltage conversion. The second voltage converter is provided between the plurality of sub power storage devices and the power feeding line, and is configured to perform bidirectional voltage conversion between one of the plurality of sub power storage devices and the power feeding line. The connection control unit is configured to control a plurality of switches provided between the plurality of sub power storage devices and the second voltage converter, respectively. The external charging unit is configured to charge the main power storage device and each of the sub power storage devices by a power supply outside the vehicle. The charged state calculation unit is configured to calculate a remaining capacity estimate value of each of the main power storage device and the plurality of sub power storage devices, based on a state detection value of each of the main power storage device and the plurality of sub power storage devices. The running mode control unit is configured to select one of a first running mode of running using stored electric energy of the electric-powered vehicle with priority without maintaining the stored electric energy and a second running mode of maintaining the stored electric energy within a certain range using the power generation mechanism, based on the remaining capacity estimate value of each of the main power storage device and the plurality of sub power storage devices. The control target setting unit is configured to set a control target for a remaining capacity of the main power storage device higher than a control target for the remaining capacity of each of the sub power storage devices. The connection control unit controls the plurality of switches such that a sequentially selected one of the plurality of sub power storage devices is connected to the second voltage converter in the first running mode, and each of the plurality of sub power storage devices is disconnected from the second voltage converter in the second running mode. The running mode control unit selects the first running mode until all of the remaining capacity estimate values of the main power storage device and the plurality of sub power storage devices decrease to the control targets, respectively, and selects the second running mode after all of the remaining capacity estimate values decrease to the control targets, respectively.

A method of controlling a power supply system for an electric-powered vehicle of still another aspect of the present invention is a method of controlling a power supply system of an electric-powered vehicle having mounted thereon a motor as a motive power source and a power generation mechanism configured to be capable of generating electric power while the vehicle is running. The power supply system includes the above-described main power storage device, the above-described first voltage converter, the above-described plurality of sub power storage devices, the above-described second voltage converter, the above-described connection control unit, and the above-described external charging unit. The method of controlling includes the steps of setting a control target for a remaining capacity of the main power storage device higher than the control target for the remaining capacity of each of the sub power storage devices at startup of the power supply system, calculating a remaining capacity estimate value of each of the main power storage device and the plurality of sub power storage devices, based on a state detection value of each of the main power storage device and the plurality of sub power storage devices, and selecting one of a first running mode of running using stored electric energy of the electric-powered vehicle with priority without maintaining the stored electric energy and a second running mode of maintaining the stored electric energy within a certain range using the power generation mechanism, based on the remaining capacity estimate value of each of the main power storage device and the plurality of sub power storage devices. In the selecting step, the first running mode is selected until all of the remaining capacity estimate values of the main power storage device and the plurality of sub power storage devices decrease to the control targets, respectively, and the second running mode is selected after all of the remaining capacity estimate values decrease to the control targets, respectively.

According to the power supply system for an electric-powered vehicle and the method of controlling the same, a usage pattern of sequentially using the plurality of sub power storage devices in the first running mode (CD mode) and disconnecting all the sub power storage devices from the power supply system in the second running mode (CS mode) can be used. Thereby, in the CS mode, the voltage on the power feeding line can be reduced without forming a short-circuit path between the main power storage device and the sub power storage devices, which can reduce the switching loss in the first voltage converter, so that the power supply system can be improved in energy efficiency. Then, in this usage pattern, stored electric energy (SOC) of the sub power storage devices available in the first running mode (CD mode) can be increased, while SOC of the main power storage device in the CS mode can be ensured. As a result, an increase in EV running distance (running distance in the CD mode) and an improvement in fuel efficiency can simultaneously be achieved.

Advantageous Effects of Invention

According to the present invention, the usage efficiency of power storage devices is improved in an electric-powered vehicle having mounted thereon a power supply system including a main power storage device and a plurality of sub power storage devices, so that an increase in EV running distance (running distance in the CD mode) and an improvement in fuel efficiency can simultaneously be achieved.

BRIEF DESCRIPTION OF DRAWINGS

FIG. 8 is a first diagram illustrating a calculation method of an electric power allocation ratio in the CD mode.

FIG. 9 is a second diagram illustrating a calculation method of an electric power allocation ratio in the CD mode.

DESCRIPTION OF EMBODIMENTS

Figure 1:
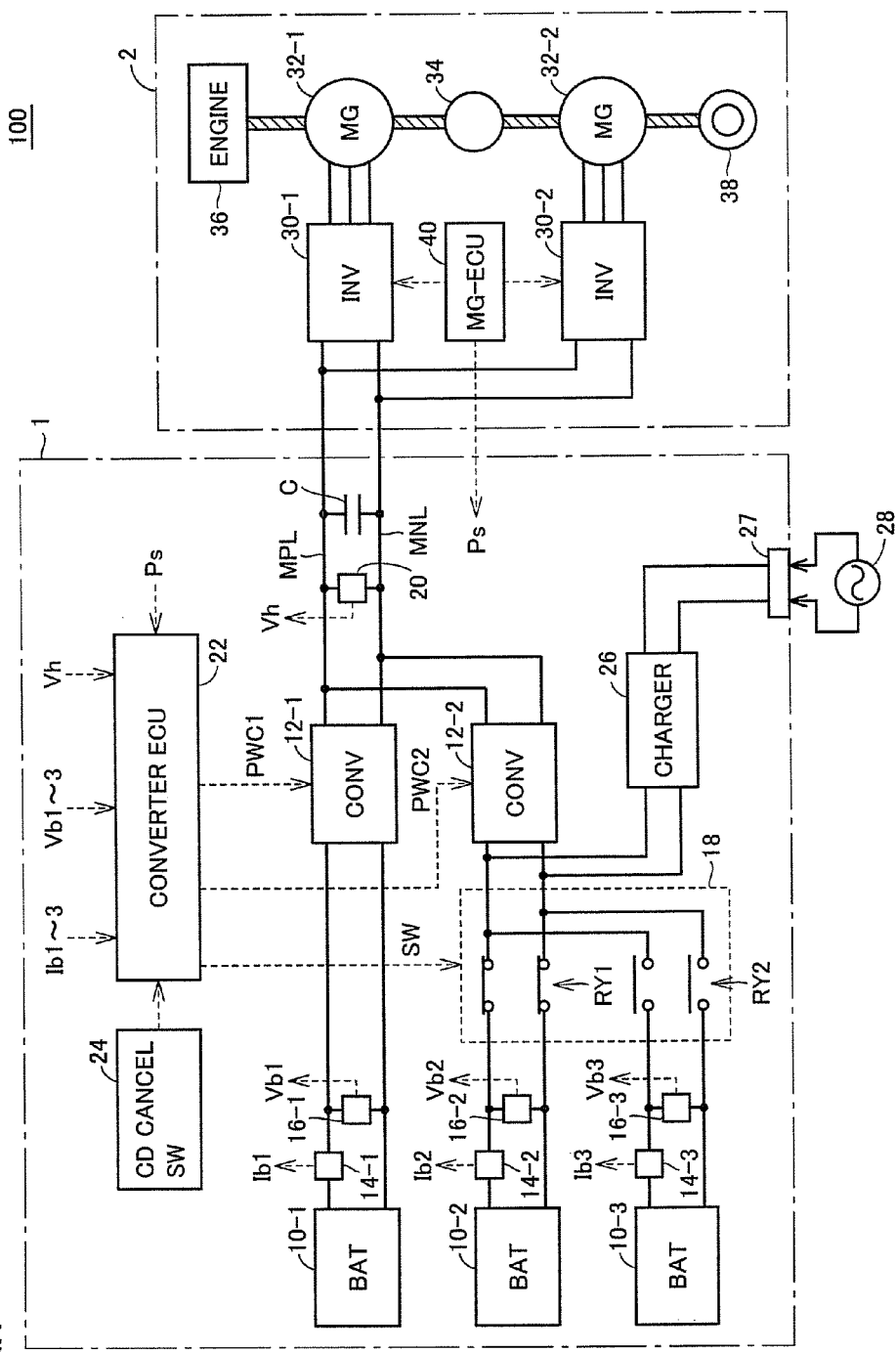
FIG. 1 is an overall block diagram of a hybrid vehicle shown as a representative example of an electric-powered vehicle including a power supply system according to an embodiment of the present invention.

An embodiment of the present invention will be described hereinafter in detail with reference to the drawings. In the drawings, the same or corresponding elements have the same reference characters allotted, and description thereof will not be repeated basically.

FIG. 1 is an overall block diagram of a hybrid vehicle shown as a representative example of an electric-powered vehicle including a power supply system according to an embodiment of the present invention.

Referring to FIG. 1, a hybrid vehicle 100 includes a power supply system 1 and a drive force generation portion 2. Drive force generation portion 2 includes a first inverter 30-1, a second inverter 30-2, a first MG (Motor-Generator) 32-1, a second MG 32-2, a power split device 34, an engine 36, a driving wheel 38, and an ECU (Electronic Control Unit) 40.

Each ECU is implemented by an electronic control unit including a CPU (Central Processing Unit) and a memory not shown, and is configured to perform calculation processing using a detection value obtained by each sensor based on a map and a program stored in the memory. Alternatively, at least part of ECU may be configured to execute prescribed numerical value/logic operation processing by means of hardware such as an electronic circuit.

First MG 32-1, second MG 32-2, and engine 36 are coupled to power split device 34. Vehicle 100 runs by using drive force from at least one of engine 36 and second MG 32-2. Motive power generated by engine 36 is split into two paths by power split device 34. Namely, one is a path for transmission to driving wheel 38, and the other is a path for transmission to first MG 32-1.

Each of first MG 32-1 and second MG 32-2 is an AC rotating electric machine, and it is implemented, for example, by a three-phase AC rotating electric machine including a rotor having a permanent magnet embedded. First MG 32-1 generates electric power by using motive power from engine 36 split by power split device 34. For example, when SOC of the power storage device (which will be described later) included in power supply system 1 becomes lower, engine 36 is started, electric power is generated by first MG 32-1, and the generated electric power is supplied to power supply system 1. Namely, in hybrid vehicle 100, first MG32-1 constitutes a "power generation mechanism."

Second MG 32-2 generates drive force by using at least one of electric power supplied from power supply system 1 and electric power generated by first MG 32-1. The drive force of second MG 32-2 is transmitted to driving wheel 38. During braking or the like of the vehicle, second MG 32-2 is driven by driving wheel 38, so that second MG 32-2 operates as a power generator. Thus, second MG 32-2 operates as a regenerative brake converting braking energy to electric power. Electric power generated by second MG 32-2 is supplied to power supply system 1.

Power split device 34 is constituted of a planetary gear including a sun gear, a pinion gear, a carrier, and a ring gear. The pinion gear is engaged with the sun gear and the ring gear. The carrier rotatably supports the pinion gear and it is coupled to a crankshaft of engine 36. The sun gear is coupled to a rotation shaft of first MG 32-1. The ring gear is coupled to a rotation shaft of second MG 32-2.

First inverter 30-1 and second inverter 30-2 are connected to a power feeding line MPL and a ground line MNL. First inverter 30-1 and second inverter 30-2 convert drive electric power (DC power) supplied from power supply system 1 to AC power and output the AC power to first MG 32-1 and second MG 32-2, respectively. In addition, first inverter 30-1 and second inverter 30-2 convert AC power generated by first MG 32-1 and second MG 32-2 into DC power and output the DC power to power supply system 1 as regenerative power.

It is noted that each of first inverter 30-1 and second inverter 30-2 has a circuit configuration of a common three-phase inverter constituted of a plurality of power semiconductor switching elements (hereinafter briefly referred to as "switching elements"). Each inverter drives a corresponding MG by performing a switching operation in response to a drive signal from ECU 40.

ECU 40 calculates request power Ps of power supply system 1 based on a detection signal from each not-shown sensor, a running state, an accelerator position, and the like, and calculates a torque target value and a speed target value of first MG 32-1 and second MG 32-2 based on calculated request power Ps. Then, ECU 40 controls first inverter 30-1 and second inverter 30-2 such that generated torque and the speed of first MG 32-1 and second MG 32-2 reach the target values. Moreover, ECU 40 outputs calculated request power Ps to an ECU 22 (which will be described later) of power supply system 1. When request power Ps has a positive value, electric power is supplied from power supply system 1 to drive force generation portion 2, and when request power Ps has a negative value, charge electric power for the power storage devices is supplied from drive force generation portion 2 to power supply system 1.

Meanwhile, power supply system 1 includes a first power storage device 10-1, a second power storage device 10-2, a third power storage device 10-3, a first converter 12-1, a second converter 12-2, a connection unit 18, power feeding line MPL, ground line MNL, and a smoothing capacitor C.

In addition, power supply system 1 further includes ECU 22 controlling operation of power supply system 1, a CD cancel switch 24, current sensors 14-1 to 14-3, and voltage sensors 16-1 to 16-3 and 20. Moreover, power supply system 1 further includes a charger 26 and a vehicle inlet 27 for use in external charging.

Each of first power storage device 10-1, second power storage device 10-2, and third power storage device 10-3 is a rechargeable DC power supply, and it is implemented, for example, by a secondary battery such as a nickel hydride battery or a lithium ion battery, a large-capacity capacitor, or the like. First power storage device 10-1 is connected to first converter 12-1. Second power storage device 10-2 and third power storage device 10-3 are connected to second converter 12-2 with connection unit 18 interposed therebetween.

Connection unit 18 is disposed between second and third power storage devices 10-2 and 10-3 and second converter 12-2. Connection unit 18 includes switches RY1 and RY2. Each of switches RY1 and RY2 is typically implemented by an electromagnetic relay.

Switch RY1 is disposed between second power storage device 10-2 and second converter 12-2. Switch RY2 is disposed between third power storage device 10-3 and second converter 12-2. Switches RY1 and RY2 are controlled to be turned on/off by a control signal SW from ECU 22.

It is noted that, hereinbelow, first power storage device 10-1 always used during operation of power supply system 1 will also be referred to as a "main power storage device", and second power storage device 10-2 and third power storage device 10-3 that may be disconnected from power supply system 1 will also be referred to as "sub power storage devices." When collectively referring to power storage devices 10-1 to 10-3, they will briefly be denoted as a "power storage device."

First converter 12-1 and second converter 12-2 are connected in parallel to power feeding line MPL and ground line MNL. First converter 12-1 carries out bidirectional voltage conversion between main power storage device 10-1 and power feeding line MPL, based on a drive signal PWC1 from ECU 22.

Second converter 12-2 carries out bidirectional voltage conversion between one sub power storage device (sub power storage device 10-2 or sub power storage device 10-3) electrically connected to second converter 12-2 by means of connection unit 18 and power feeding line MPL, based on a drive signal PWC2 from ECU 22. It is noted that, when both sub power storage devices 10-2 and 10-3 are disconnected from the second converter, operation of second converter 12-2 is stopped.

Smoothing capacitor C is connected between power feeding line MPL and ground line MNL, and reduces a high frequency component of a DC voltage on power feeding line MPL. Voltage sensor 20 detects a voltage Vh across power feeding line MPL and ground line MNL and outputs the detected value to ECU 22.

Current sensors 14-1 to 14-3 detect a current Ib1 input and output from/to main power storage device 10-1, a current Ib2 input and output from/to sub power storage device 10-2, and a current Ib3 input and output from/to sub power storage device 10-3, respectively, and output the detected values to ECU 22. Each of current sensors 14-1 to 14-3 detects a current output from a corresponding power storage device (discharge current) as a positive value and detects a current input to a corresponding power storage device (charging current) as a negative value. Though FIG. 1 shows the case where each of current sensors 14-1 to 14-3 detects a current through a positive electrode line, each of current sensors 14-1 to 14-3 may detect a current through a negative electrode line.

Voltage sensors 16-1 to 16-3 detect a voltage Vb1 of main power storage device 10-1, a voltage Vb2 of sub power storage device 10-2, and a voltage Vb3 of sub power storage device 10-3, respectively, and output the detected values to ECU 22. Although not shown, a temperature sensor is provided in each power storage device.

ECU 22 generates control signal SW for output to connection unit 18. As described above, control signal SW is set to turn on one of switches RY1 and RY2 or to turn off each of switches RY1 and RY2.

In addition, ECU 22 generates drive signals PWC1 and PWC2 for driving first converter 12-1 and second converter 12-2, respectively, based on the respective detection values from current sensors 14-1 to 14-3 and voltage sensors 16-1 to 16-3 and 20 as well as request power Ps from ECU 40. ECU 22 outputs generated drive signals PWC1 and PWC2 to first converter 12-1 and second converter 12-2, respectively, and controls first converter 12-1 and second converter 12-2.

Moreover, ECU 22 controls the running mode. Specifically, when each power storage device is charged by charger 26 which will be described later, ECU 22 sets, as the default running mode, the CD mode in which the vehicle runs mainly by using electric power stored in each power storage device without maintaining SOC thereof.

If SOC of each power storage device decreases to each control target during vehicle running in the CD mode, ECU 22 changes the running mode from the CD mode to the CS mode of running while maintaining SOC of each power storage device.

During the CD mode, unless output power exceeding available discharge electric power of a power storage device being used is required of hybrid vehicle 100 as a whole, hybrid vehicle 100 stops engine 36 and runs with outputs from second MG 32-2. Accordingly, SOC of the power storage device being used decreases. On the other hand, in the CS mode, engine 36 operates as appropriate so that first MG 32-1 generates electric power, and hence SOC of each power storage device is maintained within a certain range.

When a driver turns on CD cancel switch 24, ECU 22 changes the running mode to the CS mode regardless of SOCs of the power storage devices. Specifically, CD cancel switch 24 is a switch for the driver to switch the running mode from the CD mode, which is the default setting, to the CS mode.

CD cancel switch 24 is valid, for example, under the condition as follows. Specifically, when SOC of each power storage device becomes lower, the running mode is set to the CS mode in which engine 36 frequently or continuously operates. Then, if there is subsequently a section where the driver desires to drive in the CD mode (for example, in an urban area or around a driver's house on his/her way home), stored electric energy of the power storage device can be maintained by turning on CD cancel switch 24, and when the vehicle reaches the section where the driver desires to drive in the CD mode, the driver can drive in the desired section in the CD mode by turning off CD cancel switch 24.

Further, ECU 22 controls charge and discharge of the power storage devices. ECU 22 calculates an electric power allocation ratio indicating an allocation ratio of charge and discharge electric power between main power storage device 10-1 and a sub power storage device electrically connected to second converter 12-2 by means of connection unit 18 (hereinafter also referred to as a "selected sub power storage device"). Here, ECU 22 separately calculates the electric power allocation ratio to be used during the CD mode and the electric power allocation ratio to be used during the CS mode. The calculation method of the electric power allocation ratio will be described later in detail.

At the time of transition to the CD mode due to SOC decrease, an SOC control target in the CS mode is equivalent to the SOC control target (which will be described later) for use in determining whether the CD mode is to be switched to the CS mode. On the other hand, when CD cancel switch 24 is turned on and transition from the CD mode to the CS mode is made, the SOC control target is set at SOC at the time of transition.

Further, ECU 22 controls first converter 12-1 such that voltage Vh is adjusted to a prescribed target voltage. ECU 22 also controls second converter 12-2 such that charge and discharge currents through a selected sub power storage device match targeted amounts. As a result, charge and discharge electric power of the selected sub power storage device is controlled. It is noted that, since charge and discharge electric power of main power storage device 10-1 is obtained by subtracting charge and discharge electric power of the selected sub power storage device from charge and discharge electric power (request power Ps) of power supply system 1 as a whole, the electric power allocation ratio between main power storage device 10-1 and a selected sub power storage device can be controlled if a target value in current control by second converter 12-2 is set in accordance with the calculated electric power allocation ratio.

Hybrid vehicle 100 is provided with charger 26 and vehicle inlet 27 for externally charging each power storage device.

Charger 26 is equipment for charging each power storage device from an external power supply 28. Charger 26 is connected, for example, between second converter 12-2 and connection unit 18, and it converts electric power input from vehicle inlet 27 to charge electric power for the power storage device (direct current) and outputs the converted DC power to a power line between second converter 12-2 and connection unit 18.

When main power storage device 10-1 is charged by charger 26, first and second converters 12-1 and 12-2 are driven as appropriate, so that charge electric power is supplied successively from charger 26 through second converter 12-2, power feeding line MPL, ground line MNL, and first converter 12-1 to main power storage device 10-1. When sub power storage device 10-2 is charged by charger 26, switch RY1 is turned on and charge electric power is supplied from charger 26 to sub power storage device 10-2. When sub power storage device 10-3 is charged by charger 26, switch RY2 is turned on and charge electric power is supplied from charger 26 to sub power storage device 10-3.

It is noted for confirmation that the configuration of external charging is not limited to the illustration of FIG. 1. For example, the structure can be such that the neutral points of stator coils of first MG32-1 and second MG32-2 are connected to an AC power supply, and charge electric power for the power storage device is generated by AC-DC power conversion by a cooperative operation of inverters 30-1 and 30-2. Alternatively, a system of electromagnetically coupling an external power supply and the vehicle in a noncontact state, specifically, a structure in which a primary coil is provided at the side of the external power supply, and a secondary coil is provided at the side of the vehicle (vehicle inlet 27) to perform external charging using a mutual inductance between the primary coil and the secondary coil may be adopted.

Figure 2:
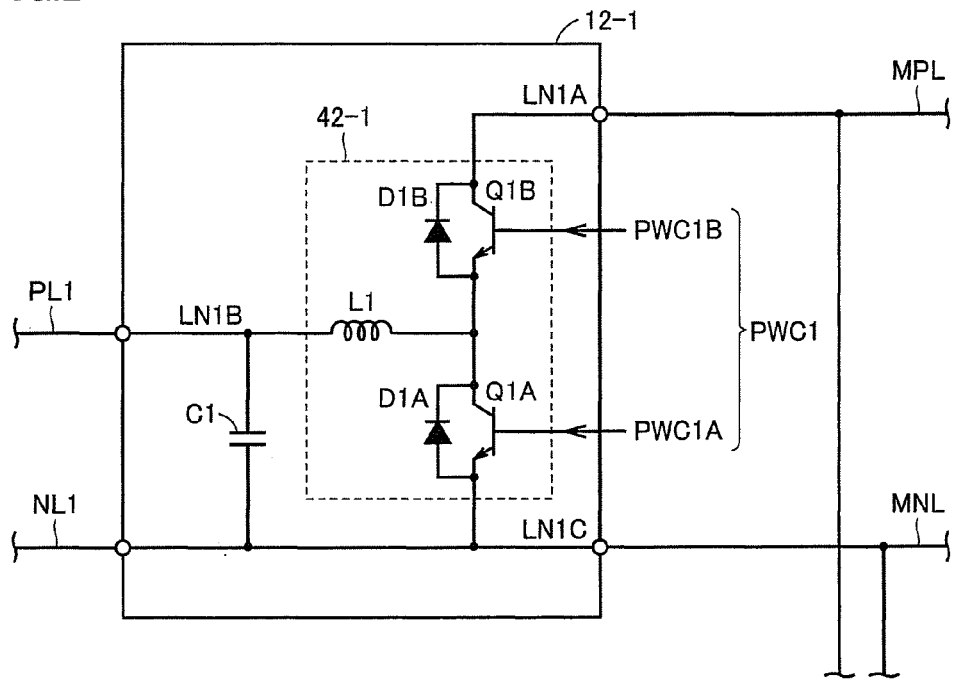
FIG. 2 is a circuit diagram showing a configuration of each converter shown in FIG. 1.

FIG. 2 is a circuit diagram showing the configuration of first and second converters 12-1 and 12-2 shown in FIG. 1.

As the respective converters are common in the configuration and the operation, the configuration and the operation of first converter 12-1 will be described hereinafter. Referring to FIG. 2, first converter 12-1 includes a chopper circuit 42-1, a power supply line LN1A, a ground line LN1C, a line LN1B, and a smoothing capacitor C1. Chopper circuit 42-1 includes power semiconductor switching elements Q1A and Q1B, diodes D1A and D1B, and an inductor L1. In this embodiment, IGBT (Insulated gate Bipolar Transistor) is illustrated as a power semiconductor switching element (hereinafter briefly referred to as a "switching element"). It is noted that a power MOS (Metal Oxide Semiconductor) transistor or a power bipolar transistor can also be used as a switching element.

Power supply line LN1A has one end connected to a collector of switching element Q1B and the other end connected to power feeding line MPL. Ground line LN1C has one end connected to a negative electrode line NL1 and the other end connected to main ground line MNL.

Switching elements Q1A and Q1B are connected in series between ground line LN1C and power supply line LN1A. Specifically, switching element Q1A has its emitter connected to ground line LN1C, and switching element Q1B has its collector connected to power supply line LN1A. Diodes D1A and D1B are connected in anti-parallel to switching elements Q1A and Q1B, respectively. Inductor L1 is connected between a connection node of switching elements Q1A and Q1B and line LN1B.

Line LN1B has one end connected to a positive electrode line PL1 and the other end connected to inductor L1. Smoothing capacitor C1 is connected between line LN1B and ground line LN1C, and reduces an AC component included in a DC voltage across line LN1B and ground line LN1C.

Chopper circuit 42-1 carries out DC voltage conversion bidirectionally between main power storage device 10-1 (FIG. 1) and power feeding line MPL, main ground line MNL, in response to drive signal PWC1 from ECU 22 (FIG. 1). Drive signal PWC1 includes a drive signal PWC1A for controlling ON/OFF of switching element Q1A constituting a lower arm element and a drive signal PWC1B for controlling ON/OFF of switching element Q1B constituting an upper arm element. Basically, switching elements Q1A and Q1B are controlled to turn on and off in a complementary manner except for a dead time in a certain duty cycle (the sum of an ON period and an OFF period).

ECU 22 controls a duty ratio (a ratio between the ON period and the OFF period) of switching elements Q1A and Q1B. When switching elements Q1A and Q1B are controlled to increase on-duty of switching element Q1A, an amount of a pump current that flows from power storage device 10-1 to inductor L1 increases and electromagnetic energy accumulated in inductor L1 increases. Consequently, at the timing of transition from the ON state to the OFF state of switching element Q1A, an amount of current emitted from inductor L1 through diode D1B to power feeding line MPL increases and the voltage of power feeding line MPL is raised.

On the other hand, when switching elements Q1A and Q1B are controlled to increase on-duty of switching element Q1B, an amount of a current that flows from power feeding line MPL through switching element Q1B and inductor L1 to power storage device 10-1 increases, and hence the voltage of power feeding line MPL is lowered.

By thus controlling the duty ratio of switching elements Q1A and Q1B, the voltage of power feeding line MPL or a direction of a current (electric power) and an amount of the current (the amount of electric power) input/output between power storage device 10-1 and power feeding line MPL can be controlled.

Moreover, converter 12-1 can also be operated in a "voltage holding mode" of equally holding an output voltage of power storage device 10-1 and a voltage of power feeding line MPL by holding switching element Q1A which is the upper arm element in its ON state (holding the switching element Q1B which is the lower arm element in its OFF state). Since power losses due to turning on/off of the switching elements do not occur in this voltage holding mode, efficiency of the converter, and in turn, fuel efficiency of hybrid vehicle 100 is improved relatively.

Here, it is understood from FIGS. 1 and 2 that, when sub power storage device 10-2 or 10-3 is connected to second converter 12-2 by means of connection unit 18, voltage Vh of power feeding line MPL needs to be set at least higher than each output voltage of main power storage device 10-1 and a selected sub power storage device such that a short-circuit path is not formed between main power storage device 10-1 and the selected sub power storage device (10-2 or 10-3) through the diode element (D1B) of the upper arm of second converter 12-2.

Moreover, the lower limit value of voltage Vh is restricted also in terms of control of MG32-1 and 32-2. Specifically, voltage Vh is preferably set higher than an induced voltage of MG32-1 and 32-2 in terms of MG control. For this reason, voltage Vh is practically controlled to be higher than both of the lower limit value in terms of battery restrictions and the lower limit value in terms of MG control.

Therefore, when sub power storage device 10-2 or 10-3 is connected to second converter 12-2, converters 12-1 and 12-2 will be required to perform a boosting operation to satisfy the lower limit value in terms of battery restrictions, even in the case where voltage Vh can be decreased in terms of MG control, particularly even in the case where boosting at converters 12-1 and 12-2 is unnecessary.

Therefore, if the state where either sub power storage device is connected to second converter 12-2 by means of connection unit 18 is maintained even after electric power of both of sub power storage devices 10-2 and 10-3, namely, all the sub power storage devices, has been used up, the number of power storage devices that can be used as a power buffer will increase, while it will be inevitable to operate converters 12-1 and 12-2 in the boosting mode.

Therefore, upon completion of use of each sub power storage device (i.e., in the CS mode), boosting in terms of battery restrictions can be eliminated if all the sub power storage devices are electrically disconnected from the power supply system by turning off each of switches RY1 and RY2 of connection unit 18. As a result, operation of second converter 12-2 can be stopped, and when boosting of first converter 12-1 becomes unnecessary in terms of MG control, converter 12-1 is operated in the voltage holding mode, so that power consumption at converters 12-1 and 12-2 can be reduced.

It is noted that, in an aspect where an electric power amount that can be input/output to/from the power storage device decreases, such as when the temperature is extremely low, it is preferable for vehicle running to connect sub power storage device 10-2 or 10-3 to second converter 12-2 even in the CS mode in order to ensure the function as a power buffer as well.

As described above, according to the present embodiment, it is determined whether or not each of sub power storage devices 10-2 and 10-3 is to be disconnected from second converter 12-2 (with or without disconnection) in the CS mode, as a usage pattern of sub power storage devices 10-2 and 10-3. Further, it is also determined, when one sub power storage device is used up, whether or not connection switching to the other sub power storage device can be performed in the CD mode (with or without connection switching). The usage pattern of sub power storage devices 10-2 and 10-3 is determined based on the temperature and the charged state (SOC) of the power storage device, an equipment failure status, or the like, at least at startup of power supply system 1 following the start of driving of hybrid vehicle 100. Moreover, in the case where the usage pattern initially determined becomes difficult to apply due to occurrence of a failure or the like during operation of power supply system 1, the usage pattern is changed each time.

Further, in the CD mode, power supply system 1 according to the present embodiment performs charge and discharge control with the electric power allocation ratio set for each of discharge and charge between main power storage device 10-1 and a selected sub power storage device (10-2 or 10-3), as described above. Therefore, by setting the electric power allocation ratio in consideration of a difference between a present SOC and an SOC control target, as well as a capacity ratio if the power storage devices differ in capacity, SOC transition following discharge or charge, in other words, the mode of use of the power storage devices can be rendered a scheduled one. The mode of use of the power storage devices needs to be determined such that stored electric energy of the power storage devices as a whole can be used effectively for vehicle running.

The mode of use of the power storage devices in the power supply system of an electric-powered vehicle according to the embodiment of the present invention will now be described using FIGS. 3 to 6. In each of FIGS. 3 to 6, SOC transition of power storage devices 10-1 to 10-3 is denoted by SOC1 to SOC3, respectively. Moreover, the capacity of the respective power storage devices are assumed to be equivalent in the following description.

Figure 3:
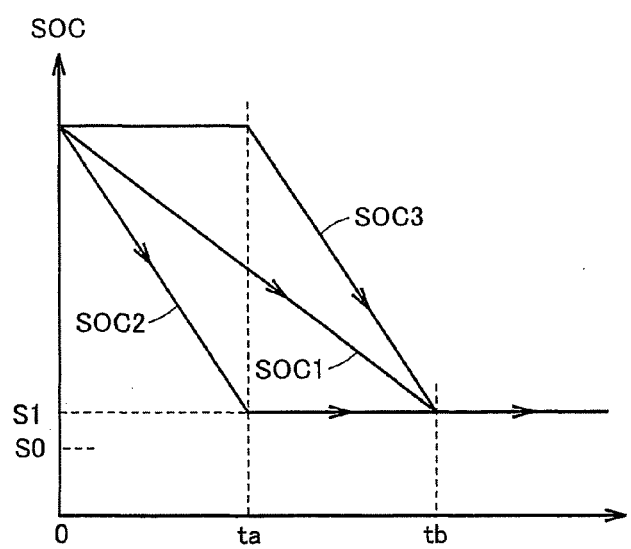
FIG. 3 is a conceptual diagram showing a comparative example of a mode of use of power storage devices in the power supply system of an electric-powered vehicle according to the present embodiment.

FIG. 3 is a conceptual diagram explaining the mode of use of a plurality of power storage devices in accordance with the running mode shown as a comparative example.

Referring to FIG. 3, in the comparative example, sub power storage devices 10-2 and 10-3 shall be used sequentially in the CD mode while connection with second converter 12-2 is switched (i.e., with connection switching in the CD mode), and in the CS mode, main power storage device 10-1 and sub power storage device 10-3 which is the last selected sub power storage device shall be used (i.e., without disconnection in the CS mode).

In the comparative example, an SOC control target of each power storage device is set at a common value S1. Therefore, hybrid vehicle 100 runs in the CD mode from the start of running (time=0) using electric power of main power storage device 10-1 and sub power storage device 10-2. In the CD mode with connection switching, the electric power allocation ratio (charge electric power allocation ratio and discharge electric power allocation ratio) between the main power storage device and a selected sub power storage device is set such that electric power of the selected sub power storage device is used with priority over electric power of main power storage device 10-1.

As a result, at time ta, SOC2 decreases to S1 indicating the SOC control target earlier than SOC1. From time ta, sub power storage device 10-3, instead of sub power storage device 10-2, is connected to second converter 12-2 as a selected sub power storage device. It is noted that the electric power allocation ratio between the main power storage device and the selected sub power storage device up to time ta is set such that SOC1 at time ta is an intermediate value between an initial value (at time=0) and S1.

From time ta, hybrid vehicle 100 runs in the CD mode using electric power of main power storage device 10-1 and sub power storage device 10-3, with electric power of sub power storage device 10-3 being used with priority over electric power of main power storage device 10-1. After time ta, the electric power allocation ratio is set such that SOC1 and SOC3 simultaneously reach S1 indicating the SOC control target. As a result, at time tb, both SOC1 and SOC3 decrease to S1, so that the running mode transitions from the CD mode to the CS mode.

After time tb when the CS mode is applied, hybrid vehicle 100 runs such that each of SOC1 and SOC3 is maintained at S1 indicating the SOC control target, with main power storage device 10-1 and sub power storage device 10-3 being connected to first converter 12-1 and second converter 12-2, respectively.

Then, in the CS mode, both main power storage device 10-1 and sub power storage device 10-3 can be used as a power buffer. On the other hand, each of converters 12-1 and 12-2 are required to perform the boosting operation, which makes it difficult to reduce power consumption.

Figure 4:
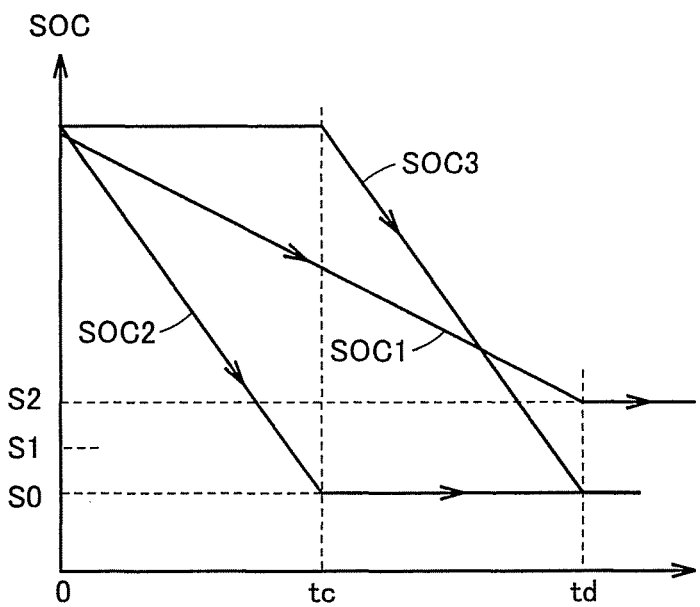
FIG. 4 is a conceptual diagram showing a first example of a mode of use of power storage devices in the power supply system of an electric-powered vehicle according to the present embodiment.

FIG. 4 shows a mode of use of the power storage devices in a basic usage pattern of the power supply system of an electric-powered vehicle according to the present embodiment.

In the power supply system of an electric-powered vehicle according to the present embodiment, at least at startup of power supply system 1, the usage pattern of sub power storage devices is determined based on the state of each power storage device at that time, specifically based on temperature, SOC, voltage, and the like, or a failure status or the like. For the usage pattern, determination is made whether or not disconnection in the CS mode is performed and whether or not connection switching in the CD mode is performed, as described above. The usage pattern is determined basically, that is, in the case where there is no abnormality in each power storage device, such that disconnection in the CS mode is performed and connection switching in the CD is performed.

In the basic usage pattern shown in FIG. 4, the SOC control target of each of sub power storage devices 10-2 and 10-3 is set at S0, and the SOC control target of main power storage device 10-1 is set at S2 (S2>S0).

Therefore, hybrid vehicle 100 runs in the CD mode from the start of running (time=0) using electric power of main power storage device 10-1 and sub power storage device 10-2, with electric power of sub power storage device 10-2 being used with priority over electric power of main power storage device 10-1. As a result, at time tc, SOC2 decreases to S1 indicating the SOC control target. Then, from time tc, sub power storage device 10-3, instead of sub power storage device 10-2, is connected to second converter 12-2 as a selected sub power storage device. It is noted that the electric power allocation ratio between the main power storage device and the selected sub power storage device up to time tc is set such that SOC1 at time tc is an intermediate value between an initial value (at time=0) and S2 indicating the SOC control target of the main power storage device.

Then, from time tc, hybrid vehicle 100 runs in the CD mode using electric power of main power storage device 10-1 and sub power storage device 10-3, with electric power of sub power storage device 10-3 being used with priority over electric power of main power storage device 10-1. After time tc, the electric power allocation ratio is set such that SOC1 reaches S2 and SOC3 reaches S0 simultaneously. As a result, at time td, SOC1 reaches S2 and SOC3 reaches S2, so that the running mode transitions from the CD mode to the CS mode.

Then, in the CS mode, both sub power storage devices 10-2 and 10-3 are electrically disconnected from second converter 12-2. Therefore, in the CS mode, hybrid vehicle 100 runs such that SOC1 is maintained at S2 with main power storage device 10-1 being connected to first converter 12-1.

This allows second converter 12-2 to be stopped, and allows first converter 12-1 to be operated in the voltage holding mode (with the boosting operation stopped). Therefore, power supply system 1 can be improved in efficiency, so that fuel efficiency in the CS mode can be improved.

Further, the SOC control target (S2) of main power storage device 10-1 that is the only one used in the CS mode is set higher than the SOC control target (S1) in FIG. 3. This can ensure stored electric energy available for vehicle running at the start of the CS mode. Preferably, S2 is set such that the sum of SOCs of main power storage device 10-1 and sub power storage device 10-3 at the start of the CS mode (time tb) in the comparative example of FIG. 3 is equivalent to SOC of main power storage device 10-1 at the start of the CS mode (time td) in the example of FIG. 4.

On the other hand, the SOC control target of each of sub power storage devices 10-2 and 10-3 used for EV running in the CD mode is set lower than the SOC control target (S2) of main power storage device 10-1 in FIG. 4 and the SOC control target (S1) of each power storage device in FIG. 3. Since the stored electric energy used in the CD mode can thereby be increased, the EV running distance can be increased.

By thus improving the usage efficiency of main power storage device 10-1 and sub power storage devices 10-2, 10-3 in the above-described basic usage pattern, an increase in EV running distance and an improvement in fuel efficiency can be achieved simultaneously.

Figure 5:
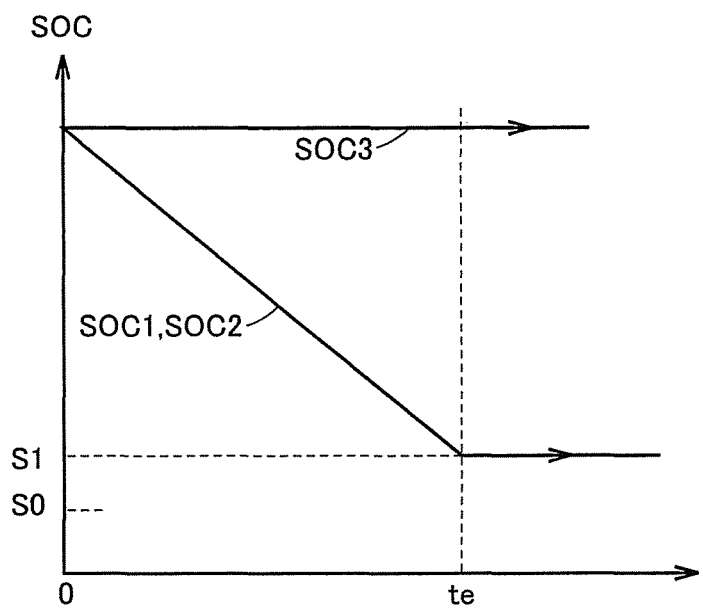
FIG. 5 is a conceptual diagram showing a second example of a mode of use of power storage devices in the power supply system of an electric-powered vehicle according to the present embodiment.

FIG. 5 shows the case where both of connection switching in the CD mode and disconnection in the CS mode are not performed, as an example of a usage pattern different from that of FIG. 4. In the example of FIG. 5, main power storage device 10-1 and sub power storage device 10-2 are connected fixedly to first converter 12-1 and second converter 12-2, respectively, throughout the CD mode and the CS mode.

In the usage pattern shown in FIG. 5, the SOC control target of each of main power storage device 10-1 and sub power storage devices 10-2, 10-3 is set at S1 (S0<S1<S2). However, one of the sub power storage devices (10-3 in FIG. 5) is not connected to second converter 12-2, i.e., unused, throughout the CD mode and the CS mode.

Referring to FIG. 5, from the start of running (time=0), hybrid vehicle 100 runs in the CD mode using electric power of main power storage device 10-1 and sub power storage device 10-2 while uniformly using electric power of both. As a result, at time te, SOC1 and SOC2 decreases to S1 indicating the SOC control target. Then, at time te, the running mode transitions from the CD mode to the CS mode.

After time te, hybrid vehicle 100 runs such that SOC1 and SOC2 are maintained at S1 with main power storage device 10-1 and sub power storage device 10-2 being connected to first converter 12-1 and second converter 12-2, respectively.

The SOC control target can thereby be set such that ensuring the EV running distance in the CD mode and ensuring stored electric energy available for vehicle running at the start of the CS mode in the above-described usage pattern are in balance.

Preferably, S1 and S2 are set such that the sum of SOCs of main power storage device 10-1 and sub power storage device 10-2 at the start of the CS mode (time te) in the example of FIG. 5 is equivalent to SOC of main power storage device 10-1 at the start of the CS mode (time td) in the example of FIG. 4.

Figure 6:
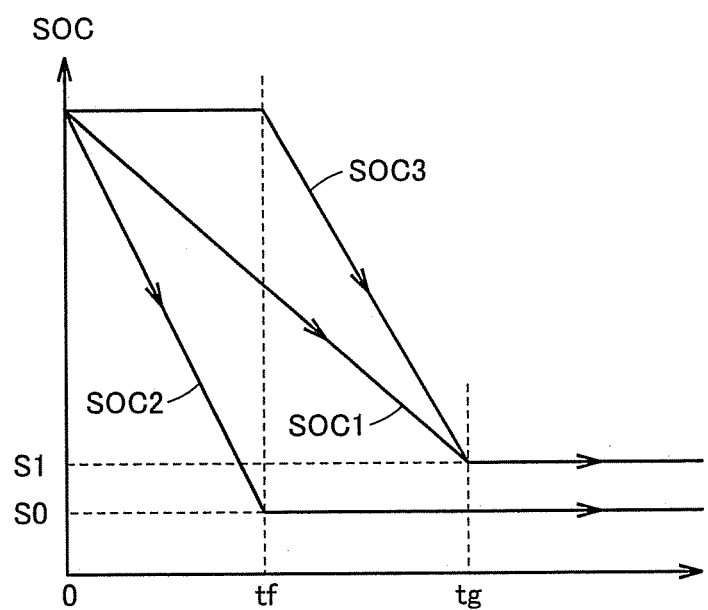
FIG. 6 is a conceptual diagram showing a third example of a mode of use of power storage devices in the power supply system of an electric-powered vehicle according to the present embodiment.

FIG. 6 shows the case where connection switching in the CD mode is performed, while disconnection in the CS mode is not performed, as a further example of a usage pattern different from that of FIG. 4. In the example of FIG. 6, sub power storage devices 10-2 and 10-3 are used in this order in the CD mode, and main power storage device 10-1 and sub power storage device 10-3 are used in the CD mode.

In the usage pattern shown in FIG. 6, the SOC control target of the sub power storage device (10-2) used only in the CD mode is set at S0, while the control target of main power storage device 10-1 and the SOC control target of the sub power storage device (10-3) used both in the CD mode and the CS mode are set at S1.

Therefore, from the start of running (time=0), hybrid vehicle 100 runs in the CD mode using electric power of main power storage device 10-1 and sub power storage device 10-2, with electric power of sub power storage device 10-2 being used with priority over electric power of main power storage device 10-1. As a result, at time tf, SOC2 decreases to S1 indicating the SOC control target. Then, from time tf, sub power storage device 10-3, instead of sub power storage device 10-2, is connected to second converter 12-2 as a selected sub power storage device. It is noted that the electric power allocation ratio between the main power storage device and the selected sub power storage device up to time tf is set such that SOC1 at time tf is an intermediate value between an initial value (at time=0) and S1 indicating the SOC control target of the main power storage device.

Then, from time tf, hybrid vehicle 100 runs in the CD mode using electric power of main power storage device 10-1 and sub power storage device 10-3, with electric power of sub power storage device 10-3 being used with priority over electric power of main power storage device 10-1. After time tf, the electric power allocation ratio is set such that SOC1 reaches S1 and SOC3 reaches S1 simultaneously. As a result, at time tf, SOC1 and SOC2 decrease to S1, so that the running mode transitions from the CD mode to the CS mode.

Then, in the CS mode, hybrid vehicle 100 runs such that both SOC1 and SOC2 are maintained at 51 indicating the SOC control target with sub power storage device 10-3 being connected to second converter 12-2.

Thereby, the EV running distance can be increased by actively using power storage device energy of the sub power storage device used only in the CD mode, and stored electric energy available for vehicle running at the start of the CS mode can be ensured.

Preferably, S1 and S2 are set such that the sum of SOCs of main power storage device 10-1 and sub power storage device 10-3 at the start of the CS mode (time tg) in the example of FIG. 6 is equivalent to SOC of main power storage device 10-1 at the start of the CS mode (time td) in the example of FIG. 4.

As described above, in the power supply system of an electric-powered vehicle according to the present embodiment, an individual SOC control target is set appropriately for each power storage device in consideration of the usage pattern of sub power storage devices determined in accordance with the state of each power storage device. Specifically, the SOC control target of each power storage device is determined such that, upon ensuring stored electric energy available at the start of the CS mode, stored electric energy to be used in the CD mode is maximized.

Referring to FIGS. 7 to 10, setting of the electric power allocation ratio as well as charge and discharge control in accordance therewith will now be described.

Figure 7:
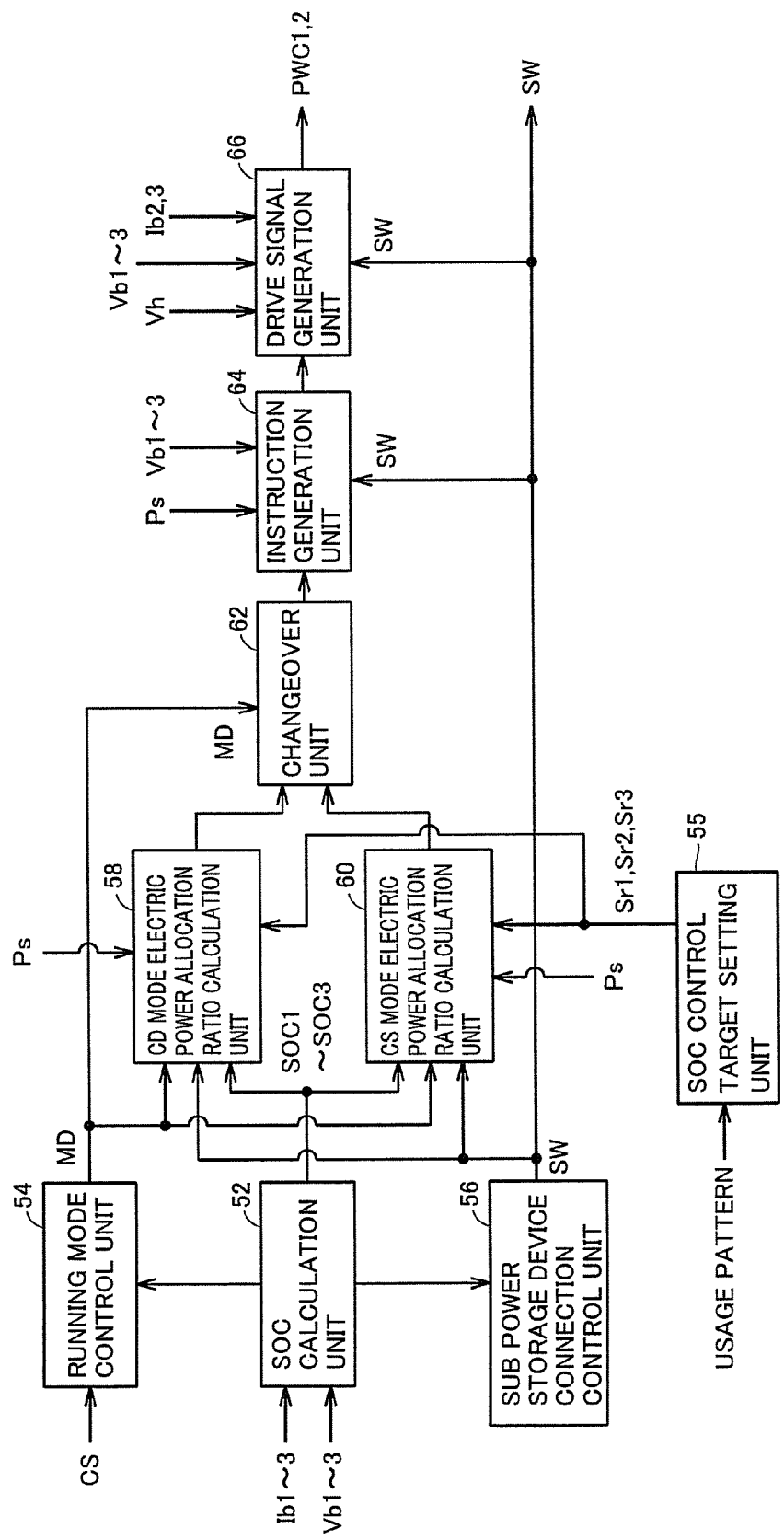
FIG. 7 is a functional block diagram illustrating a control structure for setting an electric power allocation ratio and charge and discharge control in accordance with the electric power allocation ratio.

FIG. 7 is a functional block diagram illustrating a control structure for setting the electric power allocation ratio as well as charge and discharge control in accordance with the electric power allocation ratio executed by ECU 22. Regarding each block shown in respective functional block diagrams including FIG. 7, a circuit (hardware) having a function corresponding to that block may be constructed in ECU 22, or may be implemented by ECU 22 executing software processing in accordance with a program set previously.

Referring to FIG. 7, ECU 22 includes an SOC calculation unit 52, a running mode control unit 54, an SOC control target setting unit 55, a sub power storage device connection control unit 56, a CD mode electric power allocation ratio calculation unit 58, a CS mode electric power allocation ratio calculation unit 60, a changeover unit 62, an instruction generation unit 64, and a drive signal generation unit 66.

SOC calculation unit 52 calculates SOC1 indicating a remaining capacity estimate value of first power storage device 10-1 mainly based on each detection value of current Ib1 and voltage Vb1. In addition, SOC calculation unit 52 calculates SOC2 indicating the remaining capacity estimate value of second power storage device 10-2 mainly based on each detection value of current Ib2 and voltage Vb2. Moreover, SOC calculation unit 52 calculates SOC3 indicating the remaining capacity estimate value of third power storage device 10-3 mainly based on each detection value of current Ib3 and voltage Vb3. A temperature detection value of each power storage device obtained by a temperature sensor not shown may be reflected on estimation of SOC1 to SOC3. It is noted that various known methods can be used as a method of calculating SOC, detailed description of which will not be provided.

In accordance with the usage pattern indicating whether or not disconnection in the CS mode is performed and whether or not connection switching in the CD mode is performed, SOC control target setting unit 55 sets respective SOC control targets Sr1 to Sr3 of main power storage device 10-1 and sub power storage devices 10-2, 10-3, as described with reference to FIGS. 4 to 6.

Running mode control unit 54 basically controls the vehicle running mode based on the comparison of SOC1 to SOC3 calculated by SOC calculation unit 52 and SOC control targets Sr1 to Sr3. For example, in light of the usage pattern, the CD mode is selected during a period until SOCs of power storage devices used in the CD mode all decrease to the SOC control target, while the CS mode is selected in subsequent periods.

Further, running mode control unit 54 reflects a signal CS from CD cancel switch 24 on control of the running mode. Specifically, running mode control unit 54 sets the running mode to the CS mode when it is determined that CD cancel switch 24 has been turned on based on signal CS, even while the CD mode is selected based on the SOC comparison. Running mode control unit 54 sets the running mode to the CD mode. Running mode control unit 54 outputs a signal MD indicating which one of the CD mode and the CS mode is selected.

Connection control unit 56 generates control signal SW for controlling ON/OFF of switches RY1 and RY2 of connection unit 18, in accordance with SOC2, SOC3 calculated by SOC calculation unit 52, SOC control targets Sr2, Sr3, and the usage pattern.

In the CD mode, when in the usage pattern in which connection switching is performed, control signal SW is generated such that a selected sub power storage device connected to second converter 12-2 is switched between sub power storage devices 10-2 and 10-3 based on the comparison between SOC2 or SOC3 and Sr2 or Sr3. On the other hand, when connection switching is not performed, one of sub power storage devices 10-2 and 10-3 is fixedly connected to second converter 12-2 throughout the CD mode.

In the CS mode, when in the usage pattern in which disconnection is performed, control signal SW is generated such that both sub power storage devices 10-2 and 10-3 are disconnected from second converter 12-2. On the other hand, when in the usage pattern in which disconnection is not performed, control signal SW is generated such that a selected sub power storage device at the time of transition to the CS mode is connected to second converter 12-2 in the CS mode as well.

When signal MD from running mode control unit 54 indicates the CD mode, CD mode electric power allocation ratio calculation unit 58 calculates the electric power allocation ratio to be used in the CD mode, based on SOC1 to SOC3 calculated by SOC calculation unit 52, SOC control targets Sr1 to Sr3, request power Ps of power supply system 1, and control signal SW for the connection control unit.

FIGS. 8 and 9 are diagrams for illustrating a method of calculation of the electric power allocation ratio by CD mode electric power allocation ratio calculation unit 58 shown in FIG. 7.

FIG. 8 is a diagram for illustrating a calculation method during discharge in which electric power is supplied from power supply system 1 to drive force generation portion 2, and FIG. 9 is a diagram for illustrating a calculation method during charge in which electric power is supplied from drive force generation portion 2 to power supply system 1.

FIG. 8 shows, as an example, the case where SOC1 and SOC2 are decreased in balance such that SOC1 (present value S1) of main power storage device 10-1 and SOC2 (present value S2) of sub power storage device 10-2 reach a target value TL simultaneously when sub power storage device 10-2 is electrically connected to second converter 12-2 as a selected sub power storage device in the CD mode in which connection switching is performed.

Referring to FIG. 8, CD mode electric power allocation ratio calculation unit 58 can identify a sub power storage device electrically connected to second converter 12-2, based on control signal SW from connection control unit 56.

When request power Ps has a positive value, CD mode electric power allocation ratio calculation unit 58 calculates, with regard to main power storage device 10-1, an available discharge electric power amount R1 of first power storage device 10-1 until SOC1 reaches target value TL, as shown in the following equation.

$$R1 = A(S1 - TL) \quad (1)$$

Here, "A" represents a capacity of main power storage device 10-1.

Similarly, CD mode electric power allocation ratio calculation unit 58 calculates, with regard to sub power storage device 10-2 (that is being used), an available discharge electric power amount R2 until SOC2 reaches target value TL, and calculates, with regard to sub power storage device 10-3, an available discharge electric power amount R3 until SOC3 reaches target value TL, as shown in the following equations.

$$R2 = B1(S2 - TL) \quad (2)$$

$$R3 = B2(S3 - TL) \quad (3)$$

Here, "B1" and "B2" represent capacities of sub power storage devices 10-2 and 10-3, respectively.

CD mode electric power allocation ratio calculation unit 58 then calculates the electric power allocation ratio between main power storage device 10-1 and sub power storage device 10-2 (or sub power storage device 10-3) as R1:(R2+R3).

Namely, sub power storage devices 10-2 and 10-3 intended to be sequentially used are equivalently regarded as one power storage portion, and eventually, the electric power allocation ratio is calculated such that main power storage device 10-1 and the power storage portion consisting of sub power storage devices 10-2 and 10-3 simultaneously reach target value TL.

In FIG. 8, each power storage device is assumed to have the same target value TL to facilitate understanding, however, it is noted for confirmation that the electric power allocation ratio can be calculated similarly in accordance with equations (1) to (3), even if target value TL is individually set for each power storage device.

Moreover, for a sub power storage device not connected to second converter 12-2 and unused fixedly when connection switching in the CD mode is not performed, the electric power allocation ratio can be determined similarly if an available discharge electric power amount and an acceptable charge electric power amount are made zero.

FIG. 9 shows the case where the electric power allocation ratio is set such that SOC of a selected sub power storage device and SOC of the main power storage device increase in balance toward an upper limit value TH. In the example of FIG. 9, sub power storage device 10-3 is electrically connected to second converter 12-2 as a selected sub power storage device. The present value of SOC1 is S1, and the present value of SOC3 is S3.

When request power Ps has a negative value, CD mode electric power allocation ratio calculation unit 58 calculates, with regard to main power storage device 10-1, an acceptable charge electric power amount C1 of main power storage device 10-1 until SOC1 reaches upper limit value TH, as shown in the following equation. For example, upper limit value TH is set in correspondence with an SOC value at which an acceptable charge electric power (Win) is to be restricted.

$$C1 = A(TH - S1) \quad (4)$$

Similarly, CD mode electric power allocation ratio calculation unit 58 calculates, with regard to sub power storage device 10-3 that is being used, an acceptable charge electric power amount C3 of third power storage device 10-3 until SOC reaches upper limit value TH, as shown in the following equation.

$$C3 = B2(TH - S3) \quad (5)$$

CD mode electric power allocation ratio calculation unit 58 calculates the electric power allocation ratio between main power storage device 10-1 and sub power storage device 10-3 as C1:C3. Namely, the electric power allocation ratio is calculated such that main power storage device 10-1 and sub power storage device 10-3 that is being used simultaneously reach the upper limit value during charge.

It is noted that the electric power allocation ratio in the case where sub power storage device 10-2 is electrically connected to second converter 12-2 can also similarly be calculated.

Referring again to FIG. 7, when signal MD from running mode control unit 54 indicates the CS mode, CS mode electric power allocation ratio calculation unit 60 calculates the electric power allocation ratio to be used in the CS mode, based on SOC1 to SOC3 calculated by SOC calculation unit 52, request power Ps, and control signal SW.

Figure 10:
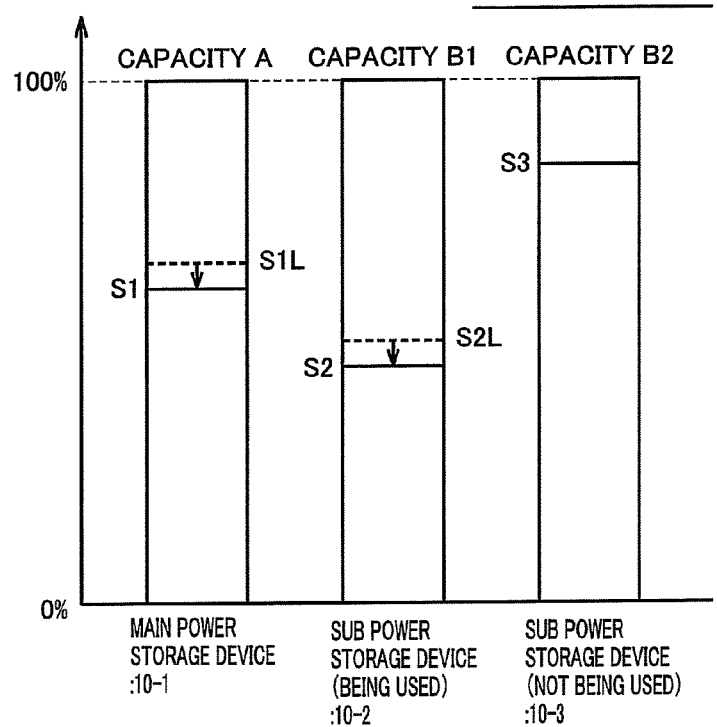
FIG. 10 is a first diagram illustrating a calculation method of an electric power allocation ratio in the CS mode.

FIG. 10 is a diagram for illustrating a method of calculation of the electric power allocation ratio by CS mode electric power allocation ratio calculation unit 60 shown in FIG. 7. FIG. 8 shows an example where the usage pattern in which disconnection is not performed is applied, and sub power storage device 10-2 is electrically connected to second converter 12-2 in the CS mode.

CS mode electric power allocation ratio calculation unit 60 can identify which one of sub power storage devices 10-2 and 10-3 is electrically connected to second converter 12-2 based on control signal SW.

Referring to FIG. 10, CS mode electric power allocation ratio calculation unit 60 calculates the electric power allocation ratio such that SOC1 of main power storage device 10-1 and SOC2 of sub power storage device 10-2 are maintained. Specifically, when SOC1 (present value S1) and SOC2 (present value S2) become lower than values S1L and S2L (equivalent to setting values of SOC control targets Sr1 and Sr2) at the time when transition from the CD mode to the CS mode is made, drive force generation portion 2 is controlled to generate charge electric power for main power storage device 10-1 and sub power storage device 10-2. Specifically, first MG 32-1 generates electric power by using motive power generated by engine 36, and the electric power is supplied to first power storage device 10-1 and second power storage device 10-2.

Here, CS mode electric power allocation ratio calculation unit 60 calculates, for example, a ratio between a capacity A of main power storage device 10-1 and a capacity B1 of sub power storage device 10-2 that is being used, as the electric power allocation ratio (charge allocation ratio).

On the other hand, when SSOC1 (present value S1) and SOC2 (present value S2) become higher than values S1L and S2L at the time when transition from the CD mode to the CS mode is made, the engine output for generating charge electric power is reduced to zero. Therefore, if the engine output for generating drive force for vehicle acceleration or the like is unnecessary, engine 36 is stopped. Thus, electric power is discharged from main power storage device 10-1 and sub power storage device 10-2. Here again, CS mode electric power allocation ratio calculation unit 60 calculates, for example, a ratio between capacity A of main power storage device 10-1 and capacity B1 of sub power storage device 10-2 that is being used, as the electric power allocation ratio (discharge allocation ratio).

Charge and discharge control can thereby be performed in the CS mode such that SOC1 of main power storage device 10-1 and SOC2 of sub power storage device 10-2 being used are maintained at S1L and S2L (namely, SOC control targets), respectively.

It is noted that, when the usage pattern in which disconnection is performed is applied, all of request power Ps is used for charge and discharge of main power storage device 10-1, so that calculation of the electric power allocation ratio is unnecessary.

Referring again to FIG. 5, when signal MD received from running mode control unit 54 indicates the CD mode, changeover unit 62 outputs the electric power allocation ratio received from CD mode electric power allocation ratio calculation unit 58 to instruction generation unit 64. On the other hand, when signal MD received from running mode control unit 54 indicates the CS mode, changeover unit 62 outputs the electric power allocation ratio received from CS mode electric power allocation ratio calculation unit 60 to instruction generation unit 64.

When it is assumed that the electric power allocation ratio received from changeover unit 62 is D1:D2, instruction generation unit 64 calculates target electric power PR indicating a target value of charge and discharge electric power of a selected sub power storage device to be connected to second converter 12-2 based on request power Ps, as shown in the following equation.

$$PR = Ps \times D2/(D1+D2) \quad (6)$$

Here, during discharge in the CD mode, in the usage pattern in which connection switching is performed, relation of D1:D2=R1:(R2+R3) is satisfied. In the usage pattern in which connection switching is not performed, R2 or R3 corresponding to a sub power storage device unused throughout the CD mode is fixed to zero, so that relation of D1:D2=R1:R2 or D1:D2=R1:R3 is satisfied.

On the other hand, during charge in the CD mode, relation of D1:D2=C1:C2 or D1:D2=C1:C3 is satisfied between main power storage device 10-1 and sub power storage device 10-2 or 10-3 which is a selected sub power storage device.

In the CS mode, in the usage pattern in which disconnection is not performed, relation of D1:D2=A:B1 or D1:D2=A:B2 is satisfied between main power storage device 10-1 and sub power storage device 10-2 or 10-3 which is a selected sub power storage device, in accordance with the capacity ratio. In the usage pattern in which disconnection is performed, all of request power Ps is used for charge and discharge of main power storage device 10-1.

In addition, instruction generation unit 64 sets a target voltage VR of voltage Vh. Here, when either sub power storage device 10-2 or 10-3 is electrically connected to second converter 12-2, voltage Vh needs to be higher than the highest value of voltages Vb1 to Vb3. Namely, a lower limit voltage of voltage Vh is set at a voltage higher than the highest value of voltages Vb1 to Vb3.

Further, also in terms of MG control, a request value (request voltage) of voltage Vh is set in accordance with the operating state of first MG 32-1 and second MG 32-2.

Therefore, when either of sub power storage devices 10-2 and 10-3 is electrically connected to second converter 12-2, instruction generation unit 64 sets target voltage VR at the higher one of the request voltage in terms of MG control and the lower limit voltage. On the other hand, when both of sub power storage devices 10-2 and 10-3 are electrically disconnected from second converter 12-2, instruction generation unit 64 sets target voltage VR in accordance with the request voltage since it is no longer necessary to take the lower limit voltage into consideration.

It is noted that instruction generation unit 64 can determine whether or not all the sub power storage devices are disconnected from second converter 12-2 based on control signal SW. Moreover, the request voltage in terms of MG control can be calculated at ECU40.

Drive signal generation unit 66 generates drive signals PWC1, PWC2 for driving first converter 12-1 and second converter 12-2, respectively, based on each detection value of voltages Vh and Vb1 to Vb3 and currents Ib2 and Ib3, target voltage VR and target electric power PR from instruction generation unit 64, and control signal SW, with a method which will be described later. Then, drive signal generation unit 66 outputs generated drive signals PWC1 and PWC2 to first converter 12-1 and second converter 12-2, respectively.

Figure 11:
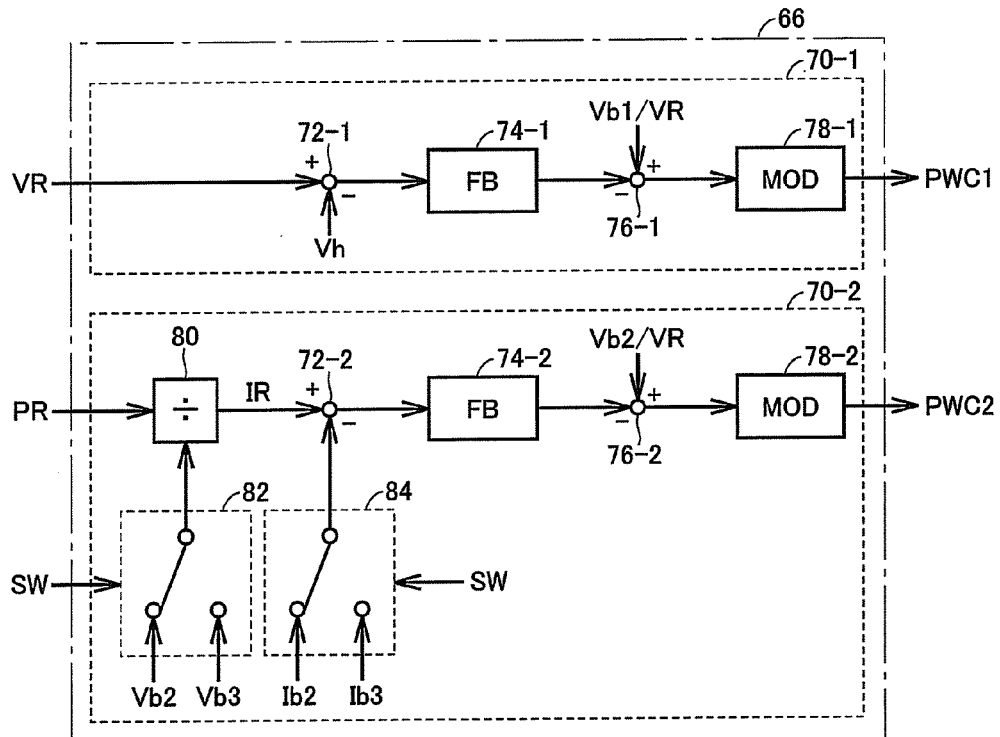
FIG. 11 is a detailed functional block diagram of a drive signal generation unit shown in FIG. 7.

FIG. 11 is a detailed functional block diagram of drive signal generation unit 66 (FIG. 5) executing charge and discharge control in accordance with the electric power allocation ratio as set.

Referring to FIG. 11, drive signal generation unit 66 includes a first control unit 70-1 for controlling first converter 12-1 and a second control unit 70-2 for controlling second converter 12-2.

First control unit 70-1 includes subtraction units 72-1 and 76-1, a feedback (FB) control unit 74-1, and a modulation unit 78-1.

Subtraction unit 72-1 subtracts a detection value of voltage Vh from target voltage VR and outputs the result of calculation to FB control unit 74-1. FB control unit 74-1 calculates an FB compensation amount based on the output from subtraction unit 72-1 and outputs the result of calculation to subtraction unit 76-1. For example, FB control unit 74-1 performs proportional integral operation based on the output from subtraction unit 72-1 and outputs the result of operation to subtraction unit 76-1.

Subtraction unit 76-1 subtracts the output from FB control unit 74-1 from a reciprocal of a theoretical boost ratio of first converter 12-1 expressed as (voltage Vb1)/(target voltage VR) and outputs the result of calculation as a duty instruction to modulation unit 78-1. It is noted that an input term in subtraction unit 76-1 (voltage Vb1/target voltage VR) is a feedforward (FF) compensation term based on the theoretical boost ratio of first converter 12-1.

Modulation unit 78-1 generates drive signal PWC1 based on the duty instruction output from subtraction unit 76-1 and carrier waves generated by a not-shown oscillation unit and outputs generated drive signal PWC1 to first converter 12-1. It is noted that, when output voltage Vb1 of main power storage device 10-1 does not need to be boosted (VR=Vb1) in the CS mode, drive signal PWC1 is generated such that first converter 12-1 is operated in the voltage holding mode.

Second control unit 70-2 includes subtraction units 72-2 and 76-2, an FB control unit 74-2, a modulation unit 78-2, a division unit 80, and switches 82 and 84.

Based on control signal SW, switch 82 outputs a detection value of voltage Vb2 to division unit 80 while sub power storage device 10-2 is a selected sub power storage device, and outputs a detection value of voltage Vb3 to division unit 80 while sub power storage device 10-2 is a selected sub power storage device. Division unit 80 divides target electric power PR by the output from switch 82 and outputs the result of calculation to subtraction unit 72-2 as a target current IR.

Based on control signal SW, switch 84 outputs a detection value of current Ib2 to subtraction unit 72-2 while sub power storage device 10-2 is a selected sub power storage device, and outputs a detection value of current Ib3 to subtraction unit 72-2 while sub power storage device 10-2 is a selected sub power storage device. Subtraction unit 72-2 subtracts the output from switch 84 from target current IR and outputs the result of calculation to FB control unit 74-2.

FB control unit 74-2 calculates an FB compensation amount based on the output from subtraction unit 72-2 and outputs the result of calculation to subtraction unit 76-2. For example, FB, control unit 74-2 performs proportional integral operation based on the output from subtraction unit 72-2 and outputs the result of operation to subtraction unit 76-2.

Subtraction unit 76-2 subtracts the output from FB control unit 74-2 from a reciprocal of a theoretical boost ratio of second converter 12-2 expressed as (voltage Vb2)/(target voltage VR) and outputs the result of calculation as a duty instruction to modulation unit 78-2. It is noted that an input term in subtraction unit 76-2 (voltage Vb2/target voltage VR) is a feedforward compensation term based on the theoretical boost ratio of second converter 12-2.

Modulation unit 78-2 generates drive signal PWC2 based on the duty instruction output from subtraction unit 76-2 and carrier waves generated by a not-shown oscillation unit and outputs generated drive signal PWC2 to second converter 12-2.

In this manner, charge and discharge of main power storage device 10-1 and a selected sub power storage device (10-2 or 10-3) can be controlled in accordance with the electric power allocation ratio set by CD mode electric power allocation ratio calculation unit 58 or CS mode electric power allocation ratio calculation unit 60.

Therefore, in the power supply system of an electric-powered vehicle according to the embodiment of the present invention, SOC transition of each power storage device in the CD mode and the CS mode can be controlled in accordance with the SOC control target of each power storage device set in consideration of the usage pattern of sub power storage devices. Since the SOC control target of each power storage device is set to improve the usage efficiency of main power storage device 10-1 and sub power storage devices 10-2, 10-3 as described above, an increase in EV running distance and an improvement in fuel efficiency can be achieved simultaneously in hybrid vehicle 100.

A control processing procedure executed by ECU 22 for achieving charge and discharge control in the power supply system of an electric-powered vehicle according to the present embodiment will now be described using a flowchart.

Figure 12:
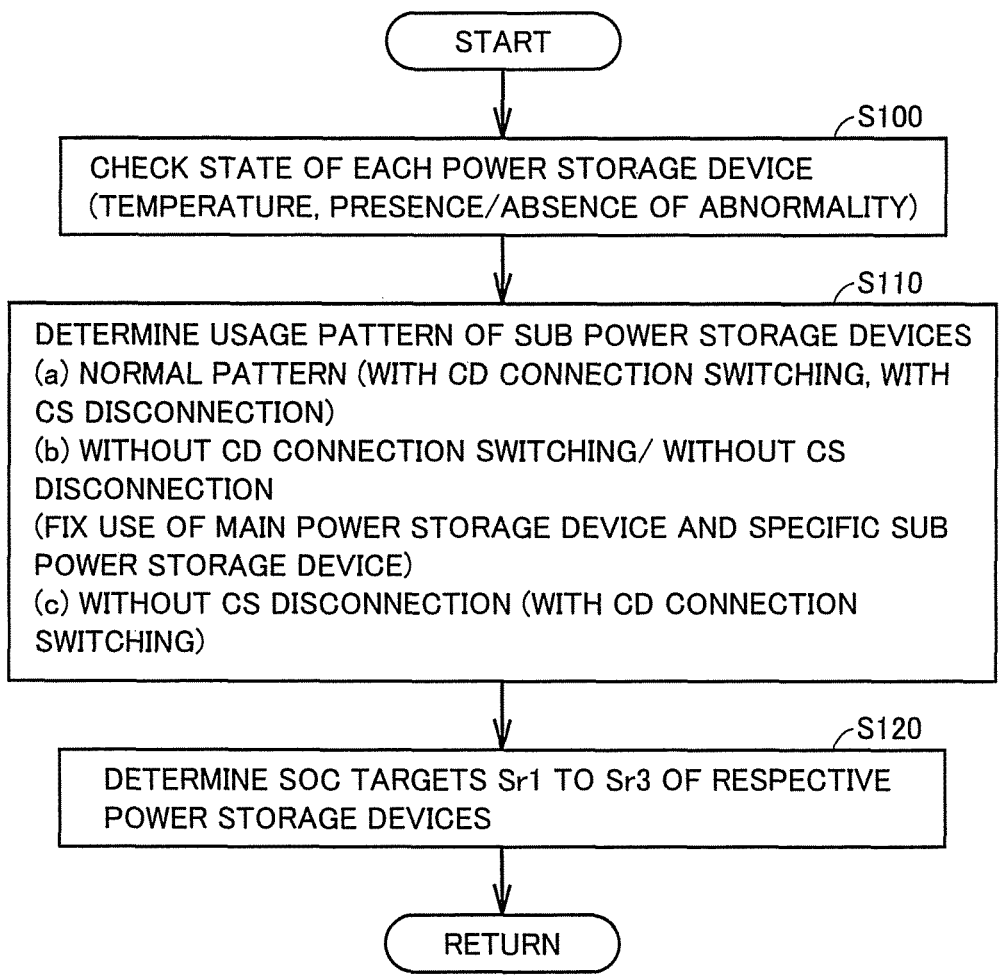
FIG. 12 is a flowchart showing a procedure for setting an SOC control target of each power storage device.

FIG. 12 shows a setting processing procedure of an SOC control target of each power storage device executed at startup of power supply system 1.

The flowchart shown in FIG. 12 is executed at least at startup of power supply system 1. Further, when such an abnormality that will necessitate changing an initial usage pattern occurs, control processing of FIG. 13 may be executed again.

Referring to FIG. 12, in step S100, ECU 22 checks the state of respective power storage devices 10-1 to 10-3. For example, the state such as the temperature and SOC of the power storage devices, and the presence/absence of abnormality are checked in step S100.

Further, in step S110, ECU 22 determines the usage pattern of power storage devices based on the state of each power storage device checked in step S100. As described above, when each of power storage devices 10-1 to 10-3 has no abnormality and can be used normally, a usage pattern (a) in which connection switching in the CD mode is performed and disconnection in the CS mode is performed is applied as a normal pattern.

On the other hand, when input/output electric power to/from the power storage devices as a whole is difficult to ensure, such as when the temperature is extremely low, usage patterns (b) and (c) in which disconnection in the CS mode is not performed is applied. Further, based on other conditions, a selection is made between the usage pattern (b) in which connection switching in the CD mode is not performed and the usage pattern (c) in which connection switching in the CD mode is performed.

Further, in step S120, ECU 22 determines SOC control targets Sr1 to Sr3 of power storage devices 10-1 to 10-3, respectively, in accordance with the usage pattern determined in step S110. Specifically, in the usage pattern (a), setting is made such that Sr1=S2 while Sr2=Sr3=S0, as shown in FIG. 4. On the other hand, in the usage pattern (b), SOC control targets Sr1 to Sr3 are set in accordance with FIG. 5, and in the usage pattern (c), SOC control targets Sr1 to Sr3 are set in accordance with FIG. 6. That is, the processing in step S120 corresponds to the function of SOC control target setting unit 55 of FIG. 7.

Figure 13:
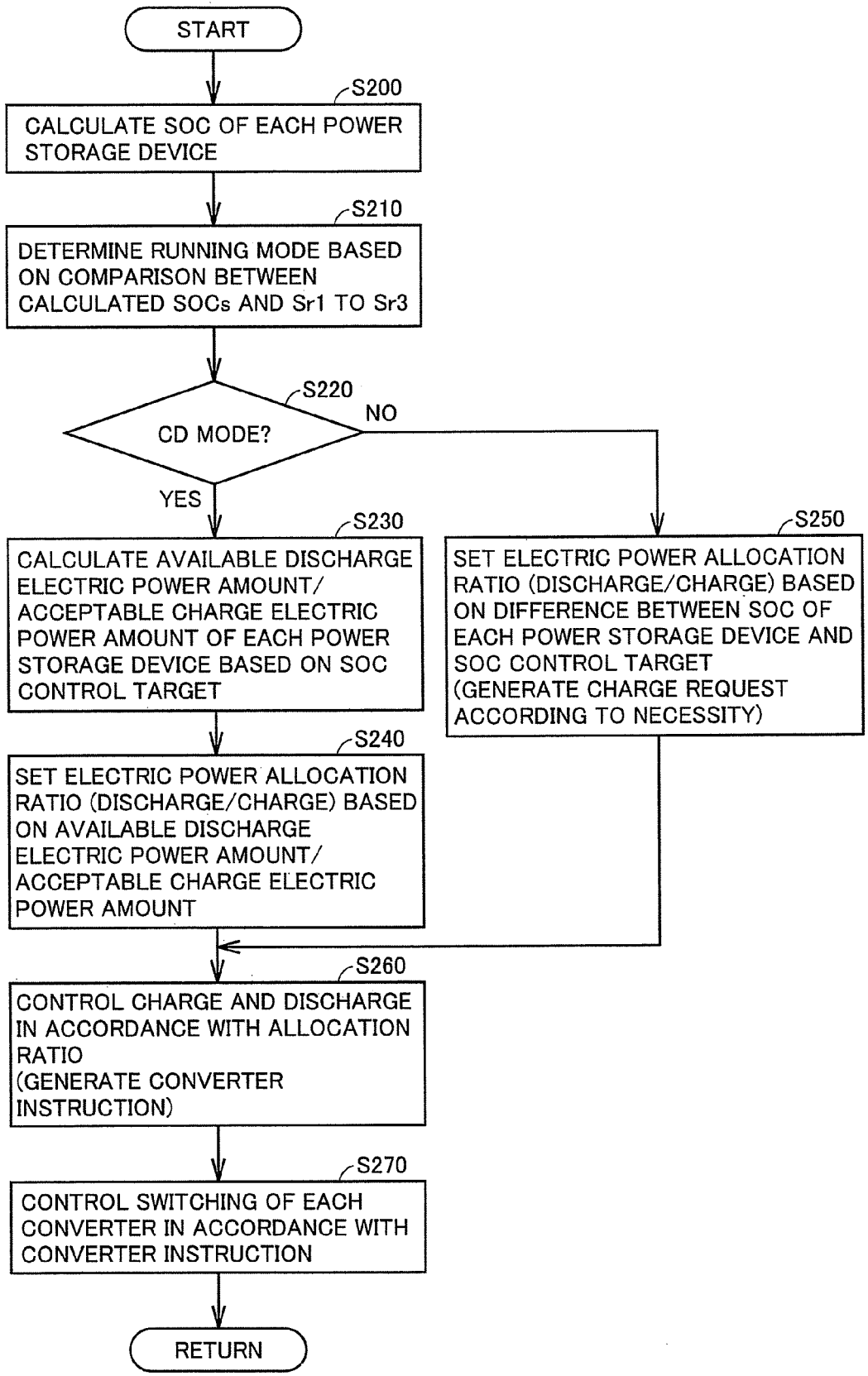
FIG. 13 is a flowchart showing a procedure for charge and discharge control of power storage devices in accordance with the SOC control target set in accordance with FIG. 12.

FIG. 13 shows a processing procedure for charge and discharge control of power storage devices 10-1 to 10-3 in accordance with the SOC control targets set in accordance with FIG. 12. The control processing shown in FIG. 13 is repeatedly executed in prescribed cycles during operation of power supply system 1.

Referring to FIG. 13, in step S200, ECU 22 calculates SOC1 to SOC3 based on state detection values (voltage, current, temperature, etc.) of each of power storage devices 10-1 to 10-3. That is, the processing in step S200 corresponds to the function of SOC calculation unit 52 of FIG. 7.

Further, in step S210, ECU 22 determines the running mode as either the CD mode or the CS mode, based on the comparison between SOC control targets Sr1 to Sr3 set in step S120 (FIG. 12) and SOC1 to SOC3 calculated in step S200. It is noted that, as described above, the running mode may be selected by reflecting, with priority, driver's designation input to CD cancel switch 24 (FIG. 1). That is, the processing in step S210 corresponds to the function of running mode control unit 54 of FIG. 7.

Furthermore, ON/OFF of switches RY1 and RY2 is controlled in accordance with the usage pattern in each running mode, so that connection between sub power storage devices 10-2, 10-3 and second converter 12-2 is controlled.

In step S220, ECU 22 determines whether the running mode determined in step S210 is the CD mode. When the CD mode is selected (YES in S220), ECU 22 advances the process to step S230, and calculates an available discharge electric power amount/acceptable charge electric power amount of each power storage device based on SOC control targets Sr1 to Sr3, as illustrated in FIGS. 8 and 9. Further, in step S240, ECU 22 sets the electric power allocation ratio between main power storage device 10-1 and a selected sub power storage device (10-2 or 10-3) based on the available discharge electric power amount/acceptable charge electric power amount calculated in step S230. As to the electric power allocation ratio, the discharge electric power allocation ratio and the charge electric power allocation ratio are set individually as described above. That is, the processing in steps S230 and S240 corresponds to the function of CD mode electric power allocation ratio calculation unit 58 of FIG. 7.

On the other hand, when the CS mode is selected (NO in S220), ECU 22 advances the process to step S250, and sets the electric power allocation ratio based on a difference between SOC of each power storage device, specifically, the main power storage device and its SOC control target, or a difference between SOCs of the main power storage device and a sub power storage device and their SOC control targets. That is, the processing in step S250 corresponds to the function of CS mode electric power allocation ratio calculation unit 60 of FIG. 7.

As described above, in the CS mode, a charge request is generated according to necessity when SOC of main power storage device 10-1 or a sub power storage device (102 or 10-3) being used is lower than the SOC control target. Accordingly, the power storage devices will be charged with electric power generated by first MG32-1 from the output of engine 36.

In step S260, ECU 22 generates a control command of first converter 12-1 or a control command of first converter 12-1 and second converter 12-2 such that charge and discharge control is executed in accordance with the electric power allocation ratio set in step S240 or S250. Then, in step S270, ECU 22 controls switching in first converter 12-1 or in first converter 12-1 and second converter 12-2, namely, ON/OFF of switching elements Q1A and Q1B, in accordance with the control command generated in step S260.

In this manner, charge and discharge of power storage devices 10-1 to 10-3 can also be controlled similarly to the case described with reference to FIGS. 4 to 11 by ECU 22 executing the control processing in accordance with FIGS. 12 and 13.

In the power supply system of an electric-powered vehicle according to the present embodiment as described above, an individual SOC control target is set for each power storage device appropriately in accordance with the usage pattern of the sub power storage devices determined depending on the state of each power storage device. In particular, the SOC control target of each power storage device is set appropriately in correspondence with a usage pattern such that, upon ensuring stored electric energy available at the start of the CS mode, stored electric energy to be used in the CD mode is maximized.

Therefore, enough stored electric energy for securing such flexibility in vehicle control that effectively utilizes stored electric energy of sub power storage devices 10-2 and 10-3 to increase the running distance in the CD mode, and that limits the operating point of the internal combustion engine to a highly efficient region in the CS mode. Therefore, by improving the usage efficiency of the power storage devices as a whole, an increase in EV running distance and an improvement in fuel efficiency can be achieved simultaneously.

Although the above-described embodiment illustrates the structure in which two sub power storage devices are disposed, three or more sub power storage devices may be disposed. In addition, the order of use of a plurality of sub power storage devices in the CD mode (with connection switching) is arbitrary. It is noted that the SOC control target in the structure in which three or more sub power storage devices are disposed can be set as follows, considering in a manner similar to the above description. Specifically, in the usage pattern of FIG. 4 (with CD connection switching and with CS disconnection), the SOC control target of each sub power storage device is set at S0, and in the usage pattern of FIG. 5 (without CD connection switching and without CS disconnection), the SOC control target is set at S1 for one sub power storage device being used. Further, in the usage pattern of FIG. 6 (with CD connection switching and without CS disconnection), the SOC control target of each sub power storage device used only in the CD mode is set at S0, while the SOC control target of a sub power storage device used both in the CD mode and the CS mode is set at S1.

In addition, in the description above, with regard to second converter 12-2, target current IR is calculated based on target electric power PR, and current FB control based on a difference between calculated target current IR and the detection value of the current sensor is carried out. Alternatively, actual electric power input and output to/from a selected power storage device may be calculated and electric power FB control based on a difference between target electric power PR and the calculated actual electric power may be carried out.

Moreover, in the description above, first converter 12-1 is subjected to voltage FB control and second converter 12-2 is subjected to current FB control (electric power FB control is also applicable). Alternatively, first converter 12-1 may be subjected to current FB control (or electric power FB control) and second converter 12-2 may be subjected to voltage FB control, according to necessity.

Further, in the above-described embodiment, drive force generation portion 2 includes first MG 32-1 and second MG 32-2, however, the number of MGs included in drive force generation portion 2 is not limited to two.

Moreover, in the description above, a series/parallel type hybrid vehicle in which motive power of engine 36 is split by power split device 34 and the split power can be transmitted to driving wheel 38 and first MG 32-1 is illustrated, however, the present invention is also applicable to hybrid vehicles having a powertrain structure other than FIG. 1, only if a mechanism capable of generating charge electric power for the power storage device during vehicle running is mounted. For example, the present invention is also applicable to what is called a series type hybrid vehicle in which engine 36 is used only for driving first MG 32-1 and second MG 32-2 alone generates drive force of the vehicle. Alternatively, the present invention is also applicable to a fuel cell car having a fuel cell mounted thereon as a power generation mechanism. For example, in the fuel cell car, running mode control similar to that described above can be executed between the CD mode of running with stored electric energy by external charging and the CS mode of generating electric power by the fuel cell. That is, an electric-powered vehicle to which the present invention is applied is not limited to the hybrid vehicle illustrated in the embodiment, but covers the above-described group of vehicles.

In the description above, second MG 32-2 corresponds to one embodiment of the "motor" in the present invention, and first MG 32-1 corresponds to one embodiment of the "power generation mechanism" in the present invention. Moreover, charger 26 and vehicle inlet 27 correspond to one example of the "external charging unit" in the present invention. Further, first converter 12-1 and second converter 12-2 correspond to one example of the "first voltage converter" and the "second voltage converter" in the present invention, respectively. Furthermore, power storage device 10-1 corresponds to one embodiment of the "main power storage device" in the present invention, and power storage devices 10-2 and 10-3 correspond to one embodiment of a "plurality of sub power storage devices" in the present invention. Moreover, SOC calculation unit 52 corresponds to one embodiment of the "charged state calculation unit" in the present invention, and SOC control target setting unit 55 corresponds to one embodiment of the "control target setting unit" in the present invention.

In addition, S110 and S120 of FIG. 12 correspond to one example of the "determining step" and the "setting step" in the present invention, respectively. Further, S200 and S210 of FIG. 13 correspond to one example of the "calculating step" and the "selecting step" in the present invention, respectively.

It should be understood that the embodiments disclosed herein are illustrative and non-restrictive in every respect. The scope of the present invention is defined by the claims, and is intended to include any modification within the meaning and scope equivalent to the terms of the claims.

INDUSTRIAL APPLICABILITY

The present invention is applicable to a power supply system having a main power storage device and a plurality of sub power storage devices, and an electric-powered vehicle having mounted thereon a mechanism generating charge electric power for the power storage devices while the vehicle is running.

REFERENCE SIGNS LIST 1 power supply system; 2 drive force generation portion; 10-1 power storage device; 10-2, 10-3 sub power storage device; 12-1 converter (main power storage device); 12-2 converter (sub power storage device); 14-1, 14-2, 14-3 current sensor; 16-1, 16-2, 16-3, 20 voltage sensor; 18 connection unit; 22 ECU (power supply system); 24 CD cancel switch; 26 charger (external charging), 27 vehicle inlet; 28 external power supply; 30-1, 30-2 inverter; 34 power split device; 36 engine; 38 driving wheel; 42-1 chopper circuit; 52 SOC calculation unit; 54 running mode control unit; 55 SOC control target setting unit; 56 connection control unit; 58 CD mode electric power allocation ratio calculation unit; 60 CS mode electric power allocation ratio calculation unit; 62 changeover unit; 64 instruction generation unit; 66 drive signal generation unit; 70-1, 70-2 control unit; 72-1, 72-2, 76-1, 76-2 subtraction unit; 74-1, 74-2 FB control unit; 78-1, 78-2 modulation unit; 80 division unit; 82, 84 switch; 100 hybrid vehicle; C smoothing capacitor; CS signal (cancel switch); D1A, D1B diode; Ib1 to Ib3 current (power storage device); IR target current; L1 inductor; LN1A power supply line; LN1B line; LN1C ground line; MD signal (running mode); MNL ground line; MPL power feeding line; NL1 negative electrode line; PL1 positive electrode line; PR target electric power; Ps request power (of the power supply system); PWC1, PWC2 drive signal (converter); PWC1A, PWC1B drive signal (upper aim element, lower arm element); Q1A, Q1B power semiconductor switching element; RY1, RY2 switch; S1, S2 SOC present value; S1L, S2L SOC value (at the time of transition to the CS mode); Sr1 to Sr3 SOC control target; SW control signal; TH SOC upper limit (during charge in the CD mode); TL SOC target value (during discharge in the CD mode); Vb1 to Vb3 voltage (power storage device); Vh voltage (power feeding line); VR target voltage (Vh).

The invention claimed is:

1. A power supply system for an electric-powered vehicle having mounted thereon a motor as a motive power source and a power generation mechanism configured to be capable of generating electric power while the vehicle is running, comprising:

a main power storage device being rechargeable;

a first voltage converter provided between a power feeding line electrically connected to said motor and to said power generation mechanism and said main power storage device, and configured to perform bidirectional voltage conversion;

a plurality of sub power storage devices, each being rechargeable, arranged in parallel to each other;

a second voltage converter provided between said plurality of sub power storage devices and said power feeding line, and configured to perform bidirectional voltage conversion between one of said plurality of sub power storage devices and said power feeding line;

a plurality of switches provided between said plurality of sub power storage devices and said second voltage converter, respectively;

an external charging unit configured to charge said main power storage device and each of said sub power storage devices by a power supply outside the vehicle;

a charged state calculation unit configured to calculate a remaining capacity estimate value of each of said main power storage device and said plurality of sub power storage devices, based on a state detection value of each of said main power storage device and said plurality of sub power storage devices;

a running mode control unit configured to select one of a first running mode of running using stored electric energy of said electric-powered vehicle with priority without maintaining the stored electric energy and a second running mode of maintaining said stored electric energy within a certain range using said power generation mechanism, based on said remaining capacity estimate value of each of said main power storage device and said plurality of sub power storage devices;

a connection control unit configured to control on/off of said plurality of switches in accordance with a selected usage pattern of a plurality of usage patterns defining a connection mode between said plurality of sub power storage devices and said second voltage converter in each of said first running mode and said second running mode; and a control target setting unit individually setting a control target for a remaining capacity of each of said main power storage device and said plurality of sub power storage devices, in accordance with said selected usage pattern, said connection control unit controlling on/off of said plurality of switches in accordance with said usage pattern in each of said first running mode and said second running mode, said running mode control unit selecting said first running mode until all of said remaining capacity estimate values of said main power storage device and said plurality of sub power storage devices decrease to said control targets, respectively, and selecting said second running mode after all of said remaining capacity estimate values decrease to said control targets, respectively, and said control target setting unit changing at least one of said control targets of said main power storage device and said plurality of sub power storage devices among said plurality of usage patterns.

2. The power supply system for an electric-powered vehicle according to claim 1, wherein when a usage pattern of disconnecting each of said plurality of sub power storage devices from said second voltage converter in said second running mode is selected, said control target setting unit sets said control target of said main power storage device higher than said control target of each of said sub power storage devices.

3. The power supply system for an electric-powered vehicle according to claim 2, wherein
when a usage pattern of fixedly connecting one sub power storage device of said plurality of sub power storage devices to said second voltage converter throughout said first running mode and said second running mode is selected, said control target setting unit sets each of said control targets of said main power storage device and said one sub power storage device at a first value, and
said first value is an intermediate value between a second value indicating said control target of each of said sub power storage devices and a third value indicating said control target of said main power storage device when a usage pattern of disconnecting each of said plurality of sub power storage devices from said second voltage converter in said second running mode is selected.

4. The power supply system for an electric-powered vehicle according to claim 1, wherein when a usage pattern of disconnecting each of said plurality of sub power storage devices from said second voltage converter in said second running mode is selected, said control target setting unit sets said control target of said main power storage device at a value higher than a value of the control target when a usage pattern of connecting one of said plurality of sub power storage devices to said second voltage converter in said second running mode is selected.

5. The power supply system for an electric-powered vehicle according to claim 1, wherein when a usage pattern of sequentially connecting one of said plurality of sub power storage devices to said second voltage converter in said first running mode and continuously connecting a last sub power storage device of said plurality of sub power storage devices to said second voltage converter in said second running mode is selected, said control target setting unit sets said control targets of said main power storage device and said last sub power storage device at a first value, and sets said control target of each of said sub power storage devices except said last sub power storage device at a second value lower than said first value.

6. The power supply system for an electric-powered vehicle according to claim 1, wherein
when a first usage pattern of connecting one of said plurality of sub power storage devices to said second voltage converter in said second running mode is selected, said control target setting unit sets each of said control targets of said main power storage device and said one sub power storage device at a first value, and when a second usage pattern of sequentially connecting one of said plurality of sub power storage devices to said second voltage converter in said first running mode and disconnecting each of said plurality of sub power storage devices from said second voltage converter in said second running mode is selected, said control target setting unit sets said control target of each of said sub power storage devices at a second value lower than said first value, and sets said control target of said main power storage device at a third value higher than said first value, and
said first to third values are determined such that, at a starting point of said second running mode, a sum of remaining capacities of said main power storage device and said one sub power storage device in said first usage pattern and a remaining capacity of said main power storage device in said second usage pattern are equivalent to each other.

7. A power supply system for an electric-powered vehicle having mounted thereon a motor as a motive power source and a power generation mechanism configured to be capable of generating electric power while the vehicle is running, comprising:
a main power storage device being rechargeable;
a first voltage converter provided between a power feeding line electrically connected to said motor and to said power generation mechanism and said main power storage device, and configured to perform bidirectional voltage conversion;
a plurality of sub power storage devices, each being rechargeable, arranged in parallel to each other;
a second voltage converter provided between said plurality of sub power storage devices and said power feeding line, and configured to perform bidirectional voltage conversion between one of said plurality of sub power storage devices and said power feeding line;
a connection control unit configured to control a plurality of switches provided between said plurality of sub power storage devices and said second voltage converter, respectively;
an external charging unit configured to charge said main power storage device and each of said sub power storage devices by a power supply outside the vehicle;
a charged state calculation unit configured to calculate a remaining capacity estimate value of each of said main power storage device and said plurality of sub power storage devices, based on a state detection value of each of said main power storage device and said plurality of sub power storage devices;
a running mode control unit configured to select one of a first running mode of running using stored electric energy of said electric-powered vehicle with priority without maintaining the stored electric energy and a second running mode of maintaining said stored electric energy within a certain range using said power generation mechanism, based on said remaining capacity estimate value of each of said main power storage device and said plurality of sub power storage devices; and
a control target setting unit configured to set a control target for a remaining capacity of said main power storage device higher than a control target for the remaining capacity of each of said sub power storage devices,
said connection control unit controlling said plurality of switches such that a sequentially selected one of said plurality of sub power storage devices is connected to said second voltage converter in said first running mode, and each of said plurality of sub power storage devices is disconnected from said second voltage converter in said second running mode, and
said running mode control unit selecting said first running mode until all of said remaining capacity estimate values of said main power storage device and said plurality of sub power storage devices decrease to said control targets, respectively, and selecting said second running mode after all of said remaining capacity estimate values decrease to said control targets, respectively.

8. A method of controlling a power supply system for an electric-powered vehicle having mounted thereon a motor as a motive power source and a power generation mechanism configured to be capable of generating electric power while the vehicle is running,
said power supply system including
a main power storage device being rechargeable, a first voltage converter provided between a power feeding line electrically connected to said motor and to said power generation mechanism and said main power storage device, and configured to perform bidirectional voltage conversion, a plurality of sub power storage devices, each being rechargeable, arranged in parallel to each other, a second voltage converter provided between said plurality of sub power storage devices and said power feeding line, and configured to perform bidirectional voltage conversion between one of said plurality of sub power storage devices and said power feeding line, a plurality of switches provided between said plurality of sub power storage devices and said second voltage converter, respectively, and an external charging unit configured to charge said main power storage device and each of said sub power storage devices by a power supply outside the vehicle, said method of controlling comprising:

selecting one of a plurality of usage patterns defining a connection mode between said plurality of sub power storage devices and said second voltage converter in each of a first running mode of running using stored electric energy of said electric-powered vehicle with priority without maintaining the stored electric energy and a second running mode of maintaining said stored electric energy within a certain range using said power generation mechanism, in accordance with a state of each of said sub power storage devices;

individually setting a control target for a remaining capacity of each of said main power storage device and said plurality of sub power storage devices, in accordance with said usage pattern selected, calculating a remaining capacity estimate value of each of said main power storage device and said plurality of sub power storage devices, based on a state detection value of each of said main power storage device and said plurality of sub power storage devices; and selecting one of said first running mode and said second running mode, based on said remaining capacity estimate value of each of said main power storage device and said plurality of sub power storage devices, on/off of said plurality of switches being controlled in each of said first running mode and said second running mode in accordance with said usage pattern selected, in said selecting step, said first running mode is selected until all of said remaining capacity estimate values of said main power storage device and said plurality of sub power storage devices decrease to said control targets, respectively, and said second running mode is selected after all of said remaining capacity estimate values decrease to said control targets, respectively, and in said setting step, at least one of said control targets of said main power storage device and said plurality of sub power storage devices is changed among said plurality of usage patterns.

9. The method of controlling the power supply system for an electric-powered vehicle according to claim 8, wherein in said setting step, when a usage pattern of disconnecting each of said plurality of sub power storage devices from said second voltage converter in said second running mode is selected, said control target of said main power storage device is set higher than said control target (Sr2, Sr3) of each of said sub power storage devices.

10. The method of controlling the power supply system for an electric-powered vehicle according to claim 9, wherein in said setting step, when a usage pattern of fixedly connecting one sub power storage device of said plurality of sub power storage devices to said second voltage converter throughout said first running mode and said second running mode is selected, each of said control targets of said main power storage device and said one sub power storage device is set at a first value, and said first value is an intermediate value between a second value indicating said control target of each of said sub power storage devices and a third value indicating said control target of said main power storage device when a usage pattern of disconnecting each of said plurality of sub power storage devices from said second voltage converter in said second running mode is selected.

11. The method of controlling the power supply system for an electric-powered vehicle according to claim 8, wherein in said setting step, when a usage pattern of disconnecting each of said plurality of sub power storage devices from said second voltage converter in said second running mode is selected, said control target of said main power storage device is set at a value higher than a value of the control target when a usage pattern of connecting one of said plurality of sub power storage devices to said second voltage converter in said second running mode is selected.

12. The method of controlling the power supply system for an electric-powered vehicle according to claim 8, wherein in said setting step, when a usage pattern of sequentially connecting one of said plurality of sub power storage devices to said second voltage converter in said first running mode and continuously connecting a last sub power storage device of said plurality of sub power storage devices to said second voltage converter in said second running mode is selected, said control targets of said main power storage device and said last sub power storage device are set at a first value, and said control target of each of said sub power storage devices except said last sub power storage device is set at a second value lower than said first value.

13. The method of controlling the power supply system for an electric-powered vehicle according to claim 8, wherein in said setting step, when a first usage pattern of connecting one of said plurality of sub power storage devices to said second voltage converter in said second running mode is selected, each of said control targets of said main power storage device and said one sub power storage device is set at a first value, and when a second usage pattern of sequentially connecting one of said plurality of sub power storage devices to said second voltage converter in said first running mode and disconnecting each of said plurality of sub power storage devices from said second voltage converter in said second running mode is selected, said control target of each of said sub power storage devices is set at a second value lower than said first value, and said control target of said main power storage device is set at a third value higher than said first value, and said first to third values are determined such that, at a starting point of said second running mode, a sum of remaining capacities of said main power storage device and said one sub power storage device in said first usage pattern and a remaining capacity of said main power storage device in said second usage pattern are equivalent to each other.

14. A method of controlling a power supply system for an electric-powered vehicle having mounted thereon a motor as a motive power source and a power generation mechanism configured to be capable of generating electric power while the vehicle is running, said power supply system including a main power storage device being rechargeable, a first voltage converter provided between a power feeding line electrically connected to said motor and to said power generation mechanism and said main power storage device, and configured to perform bidirectional voltage conversion;

a plurality of sub power storage devices, each being rechargeable, arranged in parallel to each other;

a second voltage converter provided between said plurality of sub power storage devices and said power feeding line, and configured to perform bidirectional voltage conversion between one of said plurality of sub power storage devices and said power feeding line;

a connection control unit configured to control a plurality of switches provided between said plurality of sub power storage devices and said second voltage converter, respectively; and an external charging unit configured to charge said main power storage device and each of said sub power storage devices by a power supply outside the vehicle, said method of controlling comprising the steps of:

setting a control target for a remaining capacity of said main power storage device higher than said control target for the remaining capacity of each of said sub power storage devices at startup of said power supply system;

calculating a remaining capacity estimate value of each of said main power storage device and said plurality of sub power storage devices, based on a state detection value of each of said main power storage device and said plurality of sub power storage devices; and selecting one of a first running mode of running using stored electric energy of said electric-powered vehicle with priority without maintaining the stored electric energy and a second running mode of maintaining said stored electric energy within a certain range using said power generation mechanism, based on said remaining capacity estimate value of each of said main power storage device and said plurality of sub power storage devices, said connection control unit controlling said plurality of switches such that a sequentially selected one of said plurality of sub power storage devices is connected to said second voltage converter in said first running mode, and such that each of said plurality of sub power storage devices is disconnected from said second voltage converter in said second running mode, and in said selecting step, said first running mode is selected until all of said remaining capacity estimate values of said main power storage device and said plurality of sub power storage devices decrease to said control targets, respectively, and said second running mode is selected after all of said remaining capacity estimate values decrease to said control targets, respectively.

* * * * *